(12) United States Patent
Watanabe et al.

(10) Patent No.: US 7,690,975 B2
(45) Date of Patent: Apr. 6, 2010

(54) IMAGE DISPLAY SYSTEM, IMAGE PROCESSING SYSTEM, AND VIDEO GAME SYSTEM

(75) Inventors: Yusuke Watanabe, Tokyo (JP); Satoru Miyaki, Tokyo (JP); Tukasa Yoshimura, Mitaka (JP)

(73) Assignee: Sony Computer Entertainment Inc., Tokyo (JP)

( * ) Notice: Subject to any disclaimer, the term of this patent is extended or adjusted under 35 U.S.C. 154(b) by 240 days.

(21) Appl. No.: 11/243,481

(22) Filed: Oct. 4, 2005

(65) Prior Publication Data

US 2006/0079324 A1 Apr. 13, 2006

Related U.S. Application Data

(63) Continuation of application No. PCT/JP2005/002451, filed on Feb. 17, 2005.

(30) Foreign Application Priority Data

Feb. 18, 2004 (JP) .............................. 2004-041210

(51) Int. Cl.
*A63F 13/00* (2006.01)
*G06K 9/18* (2006.01)
*G06K 9/20* (2006.01)
*G06T 5/00* (2006.01)
*H04N 3/40* (2006.01)

(52) U.S. Cl. .............................. 463/1; 463/30; 382/182; 382/184; 382/189; 382/276; 382/293; 345/581; 345/632; 345/633; 348/207.1

(58) Field of Classification Search .................. 463/30, 463/1, 42, 43; 382/182, 184, 189, 276, 293, 382/305–307; 345/581, 632, 633; 348/207.1
See application file for complete search history.

(56) References Cited

U.S. PATENT DOCUMENTS 5,577,981 A 11/1996 Jarvik (Continued)

FOREIGN PATENT DOCUMENTS

JP 7-254064 10/1995

(Continued)

OTHER PUBLICATIONS

Japanese Patent Publication translation, JP 2001-307124, A.*

(Continued)

*Primary Examiner*—Dmitry Suhol
*Assistant Examiner*—Damon J. Pierce
(74) *Attorney, Agent, or Firm*—Katten Muchin Rosenman LLP

(57) ABSTRACT

According to a function 188 which stores in the first memory for difference, pickup image data from CCD camera 42 based on a predetermined timing, a function 190 which stores in the second memory for difference, pickup image data from CCD camera 42 based on another timing, a function 192 which obtains a difference between the pickup image data stored in the first memory for difference 24 and the pickup image data stored in the second memory for difference 26, a function 194 for specifying an image having moved based on the data as a difference, a function 196 which determines whether or not the image having moved is touching the character image, and a function 200 which increases a value of parameters such as experiential value, physical energy, and offensive power, when it is determined that the image having moved comes into contact with the character image, it is possible to expand a range of card game used to be played only in a real space up to a virtual space, and offer a new game which merges the card game and video game.

8 Claims, 28 Drawing Sheets

U.S. PATENT DOCUMENTS

| | | |
|---|---|---|
| 6,175,343 B1 | 1/2001 | Mitchell et al. |
| 6,411,266 B1 | 6/2002 | Maguire, Jr. |
| 6,522,312 B2 | 2/2003 | Ohshima et al. |
| 6,633,304 B2 | 10/2003 | Anabuki et al. |
| 6,650,776 B2 | 11/2003 | Ihara et al. |
| 6,782,238 B2 | 8/2004 | Burg et al. |
| 6,853,935 B2 | 2/2005 | Satoh et al. |
| 6,972,734 B1 | 12/2005 | Ohshima et al. |
| 7,084,887 B1 | 8/2006 | Sato et al. |
| 7,295,220 B2 | 11/2007 | Zhou et al. |
| 7,298,384 B2 | 11/2007 | Anabuki et al. |
| 7,427,996 B2 | 9/2008 | Yonezawa et al. |
| 7,474,318 B2 | 1/2009 | Zhou et al. |
| 2002/0057280 A1 | 5/2002 | Anabuki et al. |
| 2002/0064382 A1 | 5/2002 | Hildreth et al. |
| 2002/0075286 A1 | 6/2002 | Yonezawa et al. |
| 2002/0095265 A1 | 7/2002 | Satoh et al. |
| 2003/0062675 A1 | 4/2003 | Noro et al. |
| 2003/0171142 A1 | 9/2003 | Kaji et al. |
| 2006/0098873 A1 | 5/2006 | Hildreth et al. |

FOREIGN PATENT DOCUMENTS

| | | |
|---|---|---|
| JP | 3025805 | 4/1996 |
| JP | 10015152 | 1/1998 |
| JP | 2000-047967 | 2/2000 |
| JP | 2000-82108 | 3/2000 |
| JP | 2000-322602 | 11/2000 |
| JP | 2001-300130 | 10/2001 |
| JP | 2001-307124 | 11/2001 |
| JP | 2002-301264 | 10/2002 |
| JP | 2003-334384 | 11/2003 |
| WO | WO 99/35633 | 7/1999 |
| WO | WO 02/29722 | 4/2002 |

OTHER PUBLICATIONS

Japanese Patent Publication translation, JP 2000-322602, A.*
Supplementary European Search Report dated Dec. 8, 2006 for corresponding European Application EP 05 71 0301.
Notice of Reasons for Refusal mailed May 2, 2006, with translation, for corresponding Japanese Application No. 2004-041210.
International Search Report dated May 17, 2005 from corresponding International Application PCT/JP2005/002451.
Notice of Reason(s) for Refusal for corresponding Japanese Patent Application JP 2006-113459, dated May 13, 2008.
Notice of Reason(s) for Refusal for corresponding Japanese Patent Application JP 2006-183879, dated May 13, 2008.
United States Office Action dated Jun. 5, 2009, from the corresponding U.S. Application.

* cited by examiner

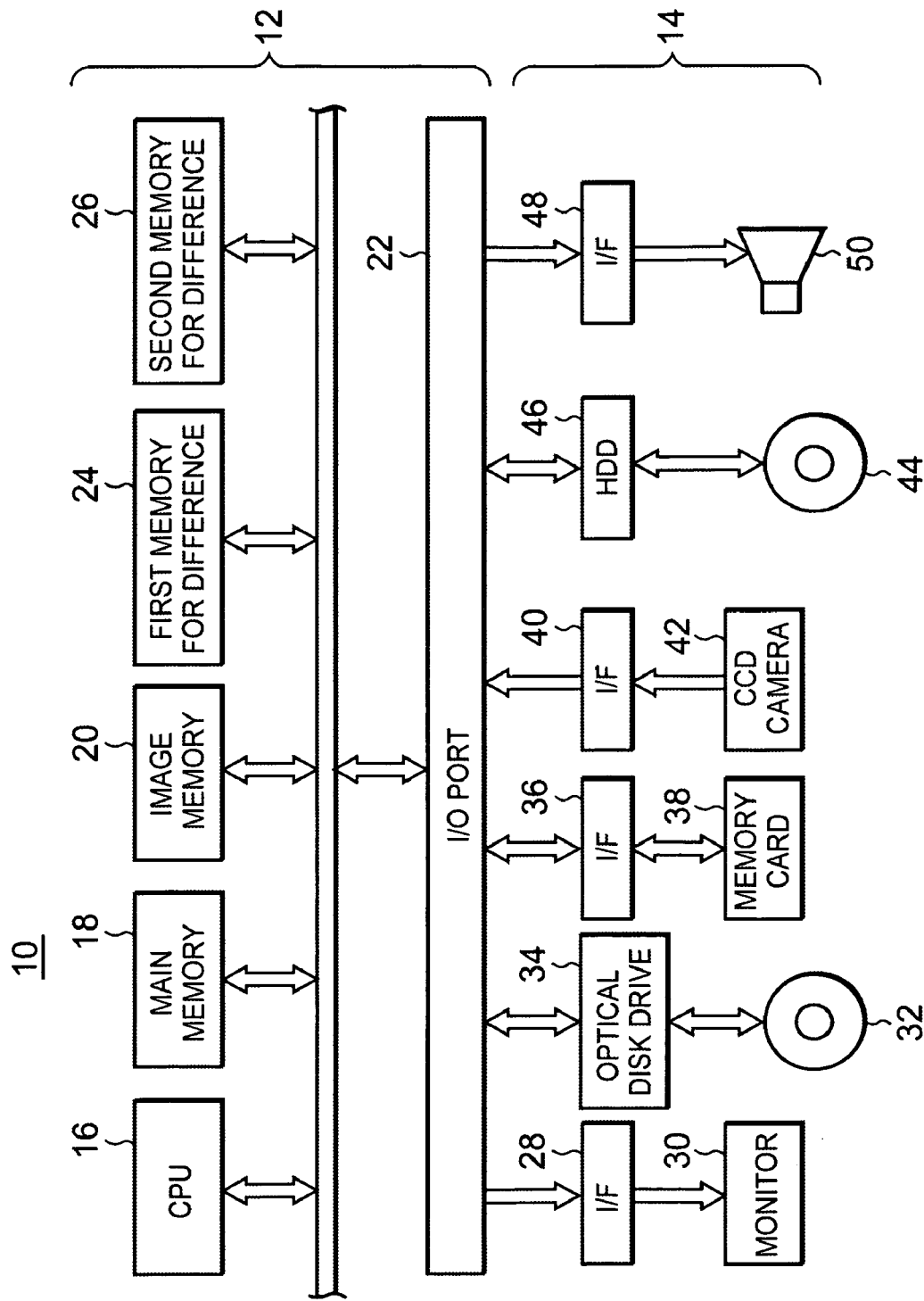

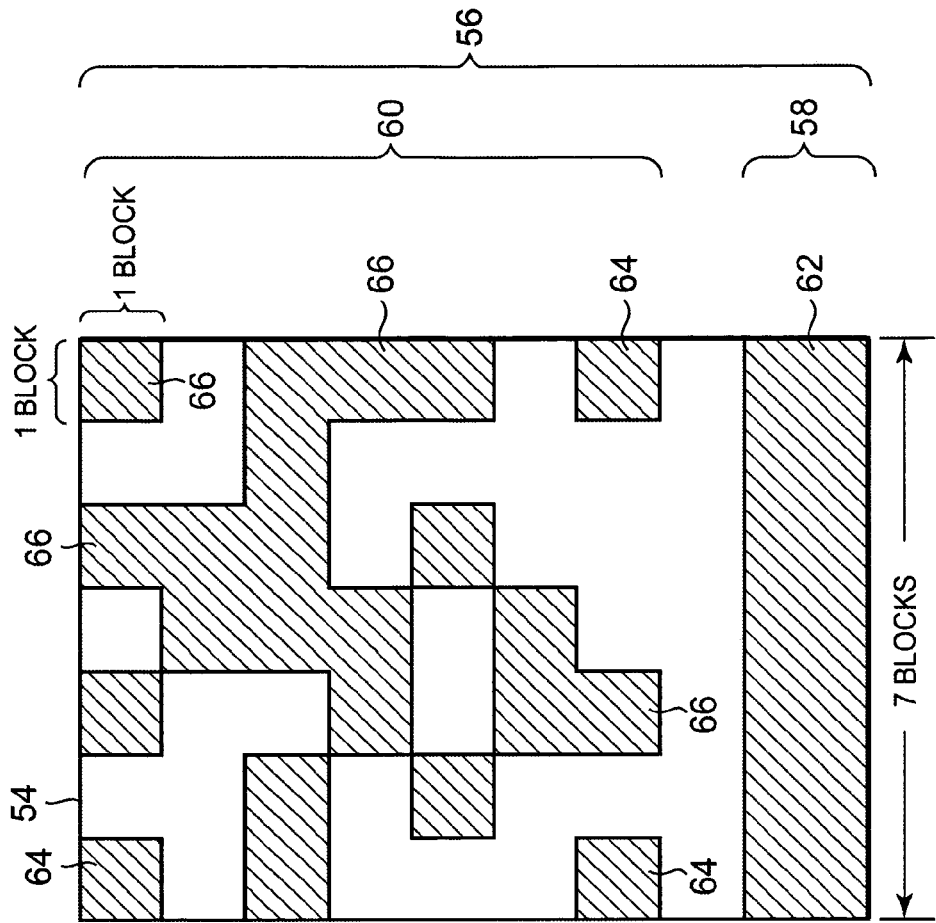

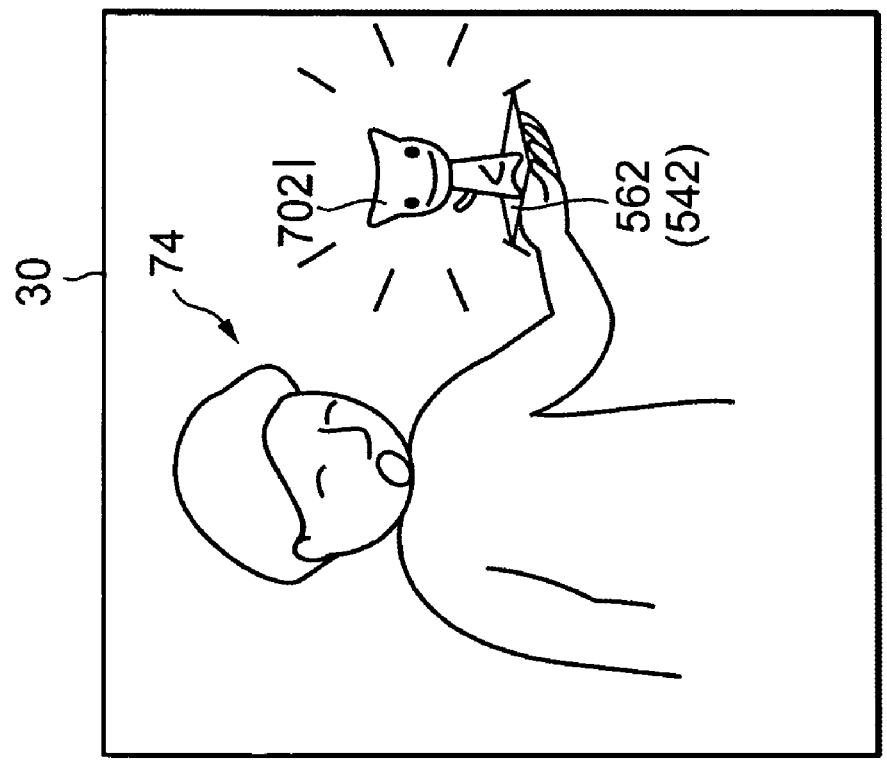
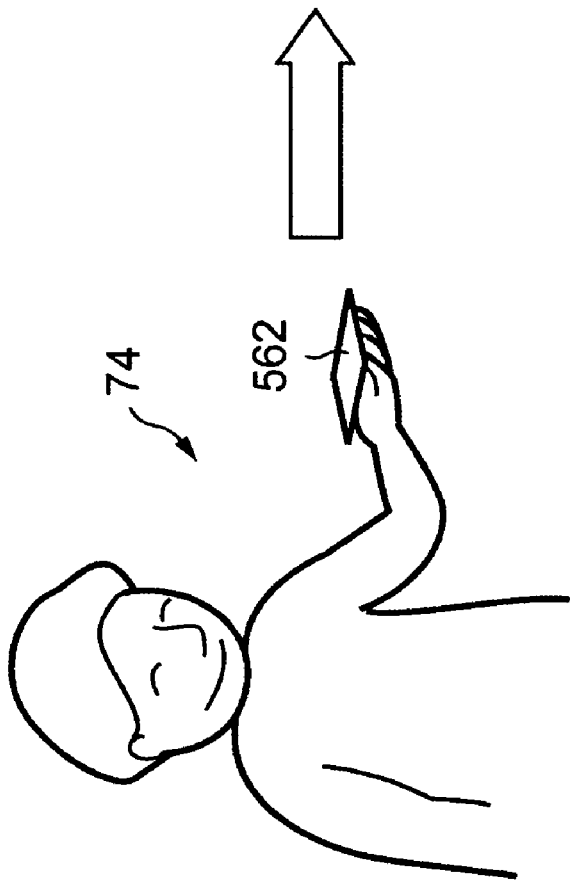

FIG. 9

OBJECT INFORMATION TABLE 118

1 RECORD
- IDENTIFICATION NUMBER
- EXPERIENTIAL VALUE, LEVEL
- STORAGE HEAD ADDRESS OF IMAGE DATA (LEVEL 1)
- LEVEL 1 (PHYSICAL ENERGY, OFFENSIVE POWER, DEFENSIVE POWER, AND THE LIKE)
- STORAGE HEAD ADDRESS OF IMAGE DATA (LEVEL 2)
- LEVEL 2 (PHYSICAL ENERGY, OFFENSIVE POWER, DEFENSIVE POWER, AND THE LIKE)
- STORAGE HEAD ADDRESS OF IMAGE DATA (LEVEL 3)
- LEVEL 3 (PHYSICAL ENERGY, OFFENSIVE POWER, DEFENSIVE POWER, AND THE LIKE)
- VALID/INVALID BIT

⋮

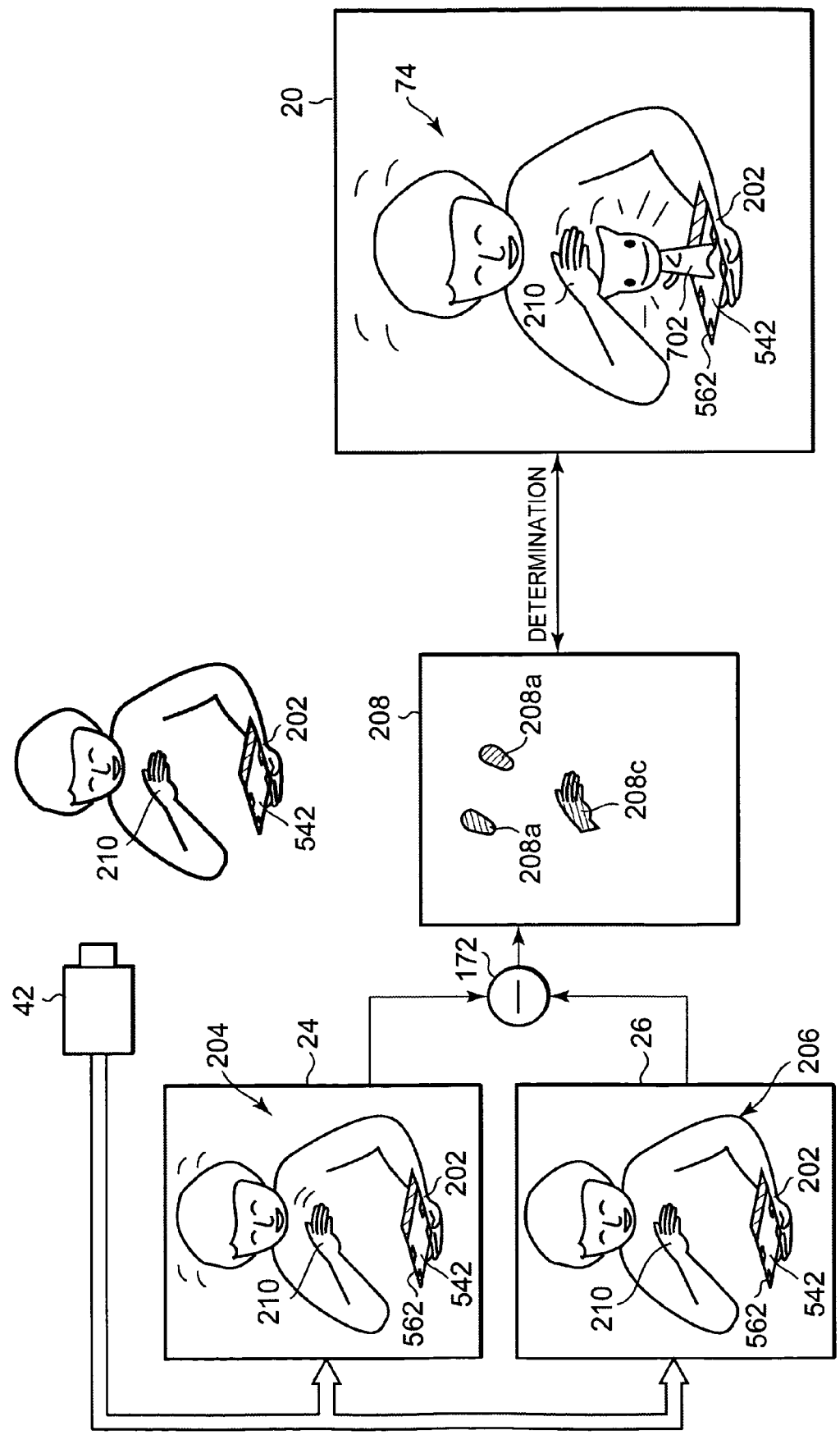

US 7,690,975 B2

IMAGE DISPLAY SYSTEM, IMAGE PROCESSING SYSTEM, AND VIDEO GAME SYSTEM

CROSS-REFERENCE TO RELATED APPLICATION

This application is a continuation of International Application PCT/JP2005/002451 filed on Feb. 17, 2005, now International Publication WO2005/077479 and claims priority from Japanese Patent Application 2004-041210 filed on Feb. 18, 2004, the contents of which are herein wholly incorporated by reference.

TECHNICAL FIELD

The present invention relates to an image display system which picks up an image of a card placed on a desk, table, and the like, and displays a three-dimensional image of an object together with the image thus picked up, the object being associated with identification information that is attached to the card, an image processing system regarding recognition of the card variously placed, and a video game system which utilizes principles of the aforementioned image display system and image processing system.

BACKGROUND ART

Japanese Patent Laid-open Publication No. 2000-82108 (hereinafter referred to as "Patent Document 1") discloses a method which picks up an image of a card by use of a CCD camera, for example, the card having an identification image (two-dimensional code and the like) attached on front or back side thereof, finds image data of the identification image attached on the card from the image data of the pickup image, and detects identification information of the card from the image data of the identification image thus found.

Evolving from the method as described above, Japanese Patent Laid-open Publication No. 2000-322602 (hereinafter referred to as "Patent Document 2") discloses an example that displays on a monitor a pickup image including an image of the card, and displays a three-dimensional image of an object associated with the identification information being detected, in such a manner as being superimposed on the image of the card displayed on the monitor. According to this method, it is possible to represent a visual effect by merging real space and virtual space.

DISCLOSURE OF THE INVENTION

Problem to be Solved by the Invention

Further evolving from the method as disclosed by the aforementioned Patent Document 2, the present invention aims to provide an image display system and an image processing system, which are easily applicable to various video games, so as to expand and diversify categories of the video games.

The present invention also aims to provide a video game system, which allows a range of card game used to be played only in a real space to expand up to a virtual space, and offers a new game which merges the card game and video game.

Means to Solve the Problem

In order to achieve the above objectives, in the present invention, an object associated with the identification information of the card is displayed in such a manner as being superimposed on the image of the card being displayed. A difference is obtained between image data picked up at a predetermined timing and image data picked up at timing different from the predetermined timing, and an image having moved is specified based on the data obtained as a difference. It is determined whether or not thus specified image comes into contact with the image of the object, and if there is a contact therebetween, a parameter associated with the identification information is changed.

If this is applied to a video game, for example, it is possible to perform a processing such that patting a character by a user may increase experiential data, physical energy, and the like of the character. Therefore, the present invention is suitable for a character breeding game, or the like. Here, the "character" indicates a type of object which is in motion, and it may be an object such as human being or animal. Alternatively, it may be an object imitating a hero who appears in a TV program, an animated cartoon movie and the like.

Then, a difference calculating processing may be configured such that it stores pickup data from the pickup means based on the first differential signal, into the first memory for difference, stores pickup data from the pickup means based on the second differential signal, into the second memory for difference, and obtains a difference between the image data stored in the first memory for difference and the image data stored in the second memory for difference.

A contact determining processing may be configured such that it determines that the specified image is in contact with the object, when screen coordinate of a part of the image specified by an image specifying means is the same as a screen coordinate of a part of the object.

The image specifying processing may specify the image having moved, as a pseudo image of the user's hand. In other words, this processing may include that if it is found that an image has moved in such a manner as being in contact with the character image, pseudo-recognition is made assuming that this image is a user's hand and the user is patting the character, for example.

The present invention obtains a difference between the image data picked up at a predetermined timing and the image data picked up at timing different from the predetermined timing, and based on the data obtained as difference, it is determined whether or not the card has moved. Then, a display processing is performed according to the result of the determination.

For example, when multiple cards are superimposed on another, a display processing is performed to display an image of a new object in such a manner as being superimposed on the image of multiple card layers. In this case, an object associated with a combination of multiple identification information items of the cards and the like may be considered as this new object.

If the present invention is applied to a video game, a scenario of the video game may proceed in accordance with the result of the determination above, for instance. In this case, if there are multiple card images being picked up, and it is determined by a card motion determining means that one card has moved, it is possible to perform a processing such that the scenario is allowed to proceed by selecting an image of the object being displayed on the image of the card which has been determined as moving, out of the multiple images of the objects displayed on the images of the cards, respectively.

Furthermore, the present invention detects identification information drawn in the card, and obtains a difference between the image data of the card picked up at a predetermined timing and the image data of the card picked up at a timing different from the predetermined timing. Based on the data obtained as a difference, it is determined whether not the card has moved. When the card has moved, the identification information of the card is detected again.

Accordingly, even when changing in position or replacement with a new card is carried out, as to multiple cards, it is possible to display an image of the object being associated with the identification information of the card, on the image of the card having moved, in such a manner as being superimposed thereon.

Further the present invention obtains a camera coordinate system of the entire pickup image, based on the position of the identification image attached to the first card existing in the pickup image, and detects identification information of the first card based on the identification image. Then, based on the camera coordinate of the first card, a placing position of another card is forecasted, and identification image attached to the other card is detected from the image at thus forecasted placing position, so as to detect identification information of the other card.

Processing for the above situation may include that the image data of the identification image of the first card, for example, is subjected to affine transformation, to detect the identification information of the first card, and the image data of the identification image of the other card is subjected to affine transformation, to detect the identification information of the other card.

For example, in the case where two users respectively place multiple cards side by side, and each of the users places the first card on a diagonal line, images of the two cards on the diagonal line are detected from the picked up image, and a rectangular area including the diagonal line is specified based on the position of two cards thus detected. Then, identification information of the remaining cards may be detected from the image data within the rectangular area thus specified.

Accordingly, it is possible to reduce the load in recognition processing for multiple cards, thereby enhancing the processing speed.

In the invention as described above, it may be also possible to allocate multiple identification information items to the identical object, and to differentiate parameters regarding the identical object in each of the multiple identification information items.

Accordingly, even as to the identical object, it is possible to freely set up differences in various parameters, such as the object may change to another object or may not change, according to a subsequent progress of scenario or a lapse of time, fast/slow speed in increasing the experiential data, or the like. Therefore, when applied to a video game, for example, it is possible to enjoy a growing process with respect to each character, ranking of the cards, and the like.

The present invention may be configured such that it is provided with a detachable storage medium, being connected to the computer, and data associated with the identification information may be managed by the storage medium. Furthermore, the computer may be connected to a network server via network, and data associated with the identification information may be managed by the network server.

In the case as described above, when a video game system of each user, for example, stores the data associated with the identification information, the object, parameters, and the like associated with a card are different by user. Therefore, transferring of card is almost meaningless if the contents of the data associated with the identification information are different. However, if the data associated with the identification information can be integrally managed by the detachable storage medium or the network server, the data associated with the identification information becomes unique to the users, and it may be commonly shared by all the users. Therefore, transferring of card becomes available.

Further, the present invention may be configured such that the identification image of the card is made of two-dimensional codes in which a large number of cells are arranged. In this case, the identification information may be changed freely, by adding a coated cell with black oil-based pen or water-based pen, or by erasing the cell with a white oil-based pen or water-based pen. This provides an enjoyment such as expecting what type of object image will appear, and into kind of form the image will change with increasing the experiential data, thereby giving a further amusement to the video game.

As described so far, according to the image display system and image processing system relating to the present invention, these systems are easily applicable various video games and thus it is possible to expand and diversify categories of the video games.

Further according to the video game system relating the present invention, it is possible to allow a range of card game used to be played only in a real space to expand up to a virtual space, and offer a new game which merges the card game and video game.

BRIEF DESCRIPTION OF DRAWINGS

FIG. 1 is a block diagram showing a configuration of a video game system relating to an embodiment of the present invention.

FIG. 2A is a plan view showing the front face of a card and FIG. 2B is a rear view showing the back side of the card.

FIG. 4A and FIG. 4B are illustrations showing another example of usage pattern of the video game system relating to the embodiment of the present invention.

FIG. 9 is an illustration showing elements of object information table.

FIG. 13A and FIG. 13B are illustrations for explaining a process to obtain a detection area based on one card placed on a desk, table, or the like.

FIG. 21 is an illustration showing a process to detect an image in motion, based on differential calculation of pickup image data.

BEST MODE FOR CARRYING OUT THE INVENTION

Figure 3A:
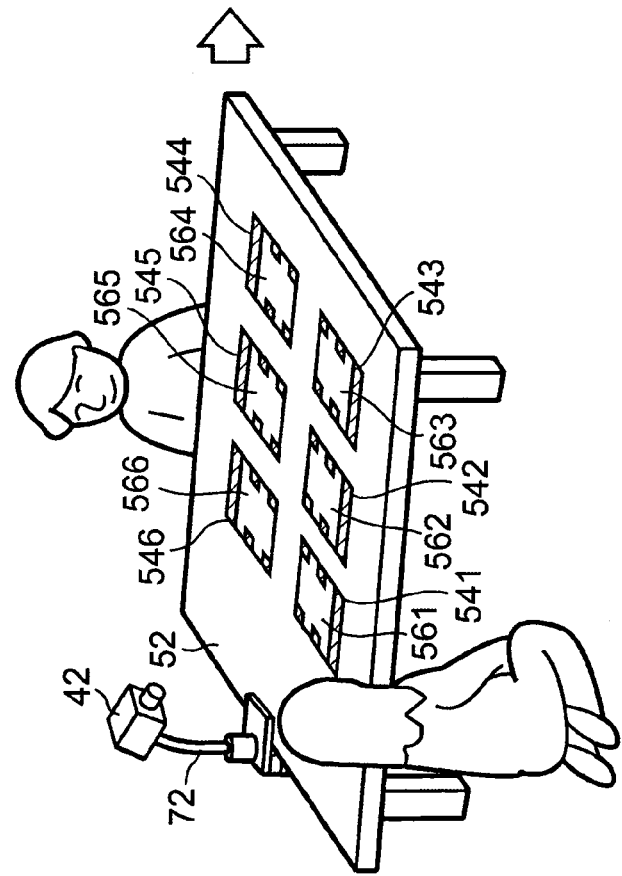
FIG. 3A and FIG. 3B are illustrations showing one example of usage pattern of the video game system relating to the embodiment of the present invention.

In the following, preferred embodiments will be described in detail in which an image display system and image processing system relating to the present invention have been applied to a video game system, with reference to the accompanying drawings, FIG. 1 to FIG. 29.

As shown in FIG. 1, the video game system 10 relating to the present embodiment includes a video game machine 12 and various external units 14.

The video game machine 12 includes CPU 16 which executes various programs, main memory 18 which stores various programs and data, image memory 20 in which image data is recorded (drawn), I/O port 22 which exchanges data with the various external units 14, a first memory for difference 24 and a second memory for difference 26 to perform differential calculation as described below.

Various external units 14 connected to the I/O port 22 includes, a monitor 30 which is connected via a display-use interface (I/F) 28, an optical disk drive 34 which carries out reproducing/recording from/on an optical disk (DVD-ROM, DVD-RW, DVD-RAM, CD-ROM, and the like) 32, memory card 38 being connected via a memory card-use interface (I/F) 36, CCD camera 42 being connected via pickup-use interface (I/F) 40, hard disk drive (HDD) 46 which carries out reproducing/recording from/on the hard disk 44, and a speaker 50 being connected via the audio-use interface 48. It is a matter of course that connection may be established with the Internet (not illustrated) from the I/O port 22 via a router not illustrated.

Data input and output to/from the external units 14 and data processing and the like within the video game machine 12 are carried out by way of the CPU 16 and main memory 18. In particular, pickup data and image data are recorded (drawn) in the image memory 20.

Next, characteristic functions held by the video game system 10 relating to the present embodiment will be explained with reference to FIG. 2 to FIG. 31, that is, functions being implemented by programs provided to the video game machine 12, via a recording medium such as optical disk 32, memory card 38, hard disk 44, being available for random access, and further via a network such as the Internet, and Intranet.

Firstly, a card 54 used in this video game system 10 will be explained. This card 54 has a size and a thickness being the same as a card used in a general card game. As shown in FIG. 2A, on the front face, there is printed a picture representing a character being associated with the card 54. As shown in FIG. 2B, the identification image 56 is printed on the reverse side. It is a matter of course that a transparent card is also available. In this case, only the identification image 56 is printed.

Patterns of two-dimensional code (hereinafter abbreviated as "2D code") as shown in FIG. 2B configure the identification image 56. One unit of the identification image 56 is assumed as one block, and logo part 58 and code part 60 are arranged in such a manner as being separated by one block within a range of rectangle, 9.5 blocks length vertically, and seven blocks length horizontally. In the logo part 58, there is provided a black colored reference cell 62, being 2D code for notifying the reference position of the code part 60 and the orientation of the card 54, with a shape of large-sized rectangle having a length corresponding to 1.5 blocks vertically and a length corresponding to 7 blocks horizontally. There is also a case that a name of character, a mark (logo) for advertisement, or the like, is printed in the logo part 58, for example.

The code part 60 is in a square range having seven blocks both vertically and horizontally, and at each of the corner sections, corner cells 64 each being a black square, for example, for recognizing identification information, are placed. Furthermore, identification cells 66, each being black square for example, are provided in the area surrounded by four corner cells 64 in such a manner as being two-dimensionally patterned, so as to recognize the identification information.

Since a method for detecting a position of the identification image 56 from the pickup image data, a method for detecting the images at the corner cells 64, and a method for detecting the 2D pattern of the identification cells 66 are described in detail in the Patent Document 1 (Japanese Patent Laid-open Publication No. 2000-82108) as mentioned above, it is advised that the Patent Document 1 is referred to.

In the present embodiment, an association table is registered, which associates various 2D patterns of the identification cells 66 with the identification numbers respectively corresponding to the patterns, for example, in a form of database 68 (2D code database, see FIG. 6 and FIG. 7), in the hard disk 44, optical disk 32, and the like. Therefore, by collating a detected 2D pattern of the identification cells 66 with the association table within the database 68, the identification number of the card 54 is easily detected.

Figure 3B:
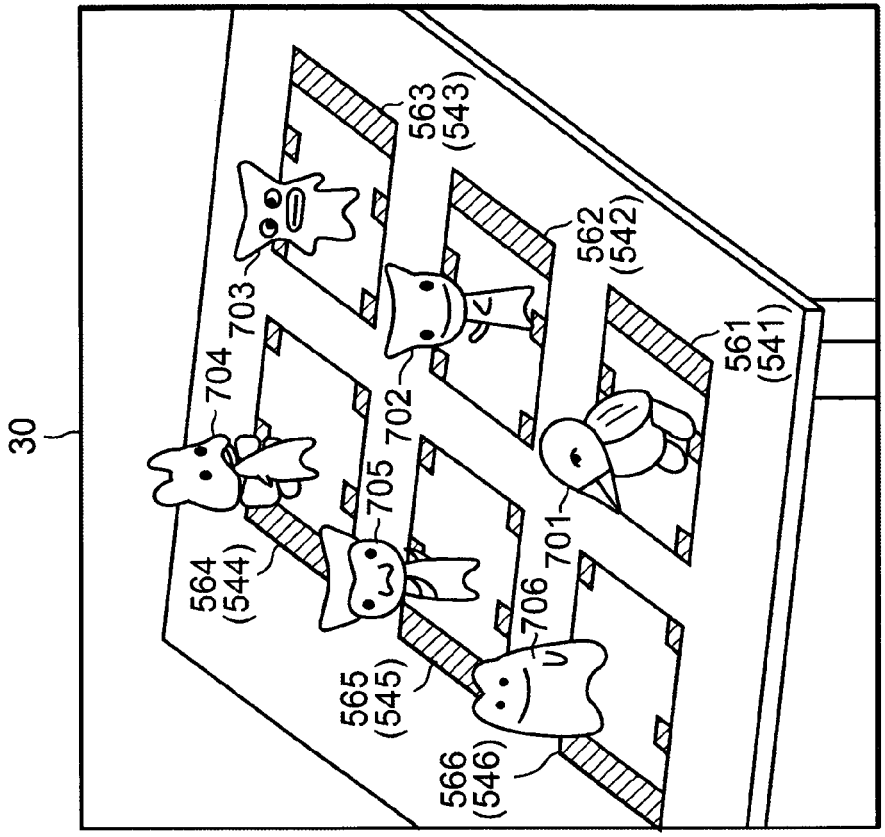

As shown in FIG. 3A and FIG. 3B, the functions implemented by the video game system is to pick up images by the CCD camera 42, for example, of six cards 541, 542, 543, 544, 545, and 546, which are placed on a desk, table or the like 52, to display thus picked up images in the monitor 30. Simultaneously, on the images of the cards 541 to 546 displayed in the screen of the monitor 30, for example, on the identification images 561, 562, 563, 564, 565, and 566 respectively attached to the cards 541, 542, 543, 544, 545, and 546, images of objects (characters) 701, 702, 703, 704, 705, and 706 are displayed respectively associated with the identification images 561 to 566 of the cards 541 to 546 in such a manner as being superimposed thereon. According to the displaying manner as described above, it is possible to achieve a game which is a mixture of a game and a video game. Here, the "character" indicates an object such as a human being, an animal, and a hero or the like who appears in a TV show, animated movie, and the like.

As shown in FIG. 3A, the CCD camera 42 is installed on stand 72 which is fixed on the desk, table, or the like 52. Imaging surface of the CCD camera 42 may be adjusted, for example, by users 74A and 74B, so as to be oriented to the part on which the cards 541 to 546. It is a matter of course that, as shown in FIG. 4A, an image of the user 74 who holds one card 542, for example, is picked up, so as to be seen in the monitor 30, thereby as shown in FIG. 4B, displaying the image of the user 74, the identification image 562 of the card 542, and the character image 702. Accordingly, it is possible to create a scene such that a character is put on the card 542 held by the user 74.

The functions of the present embodiment as described above are achieved, when the CPU 16 executes an application program to implement those functions, out of various programs installed in the hard disk 44 for example.

Figure 5:
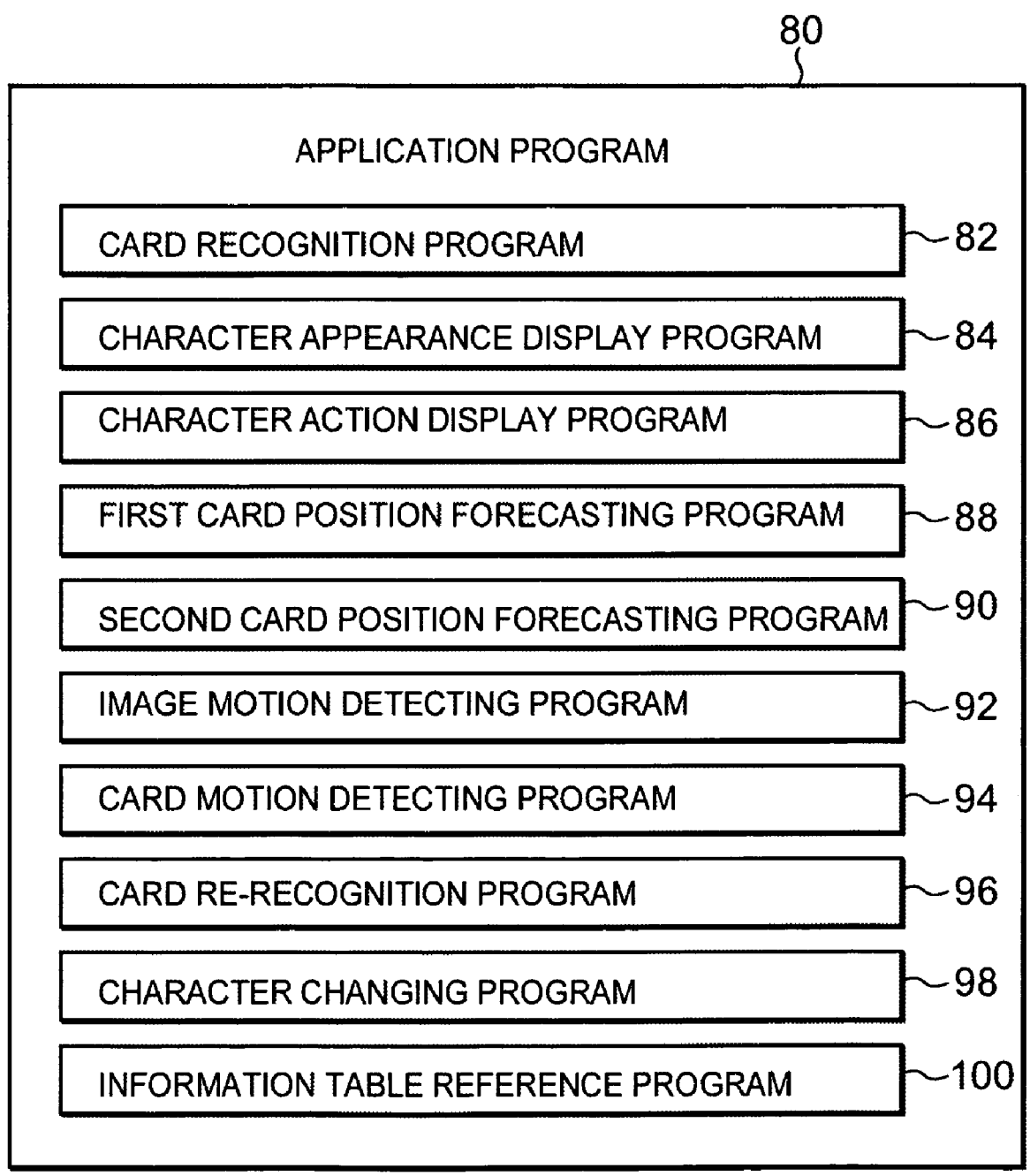
FIG. 5 is a configuration diagram showing application programs which are executed in the video game system relating to the embodiment of the present invention.

As shown in FIG. 5, the application program 80 includes, card recognition program 82, character appearance display program 84, character action display program 86, the first card position forecasting program 88, the second card position forecasting program 90, image motion detecting program 92, card motion detecting program 94, card re-recognition program 96, character changing program 98, and information table reference program 100.

Here, functions of the application program 80 will be explained with reference to FIG. 5 to FIG. 29.

Card Recognition Program

Figure 6:
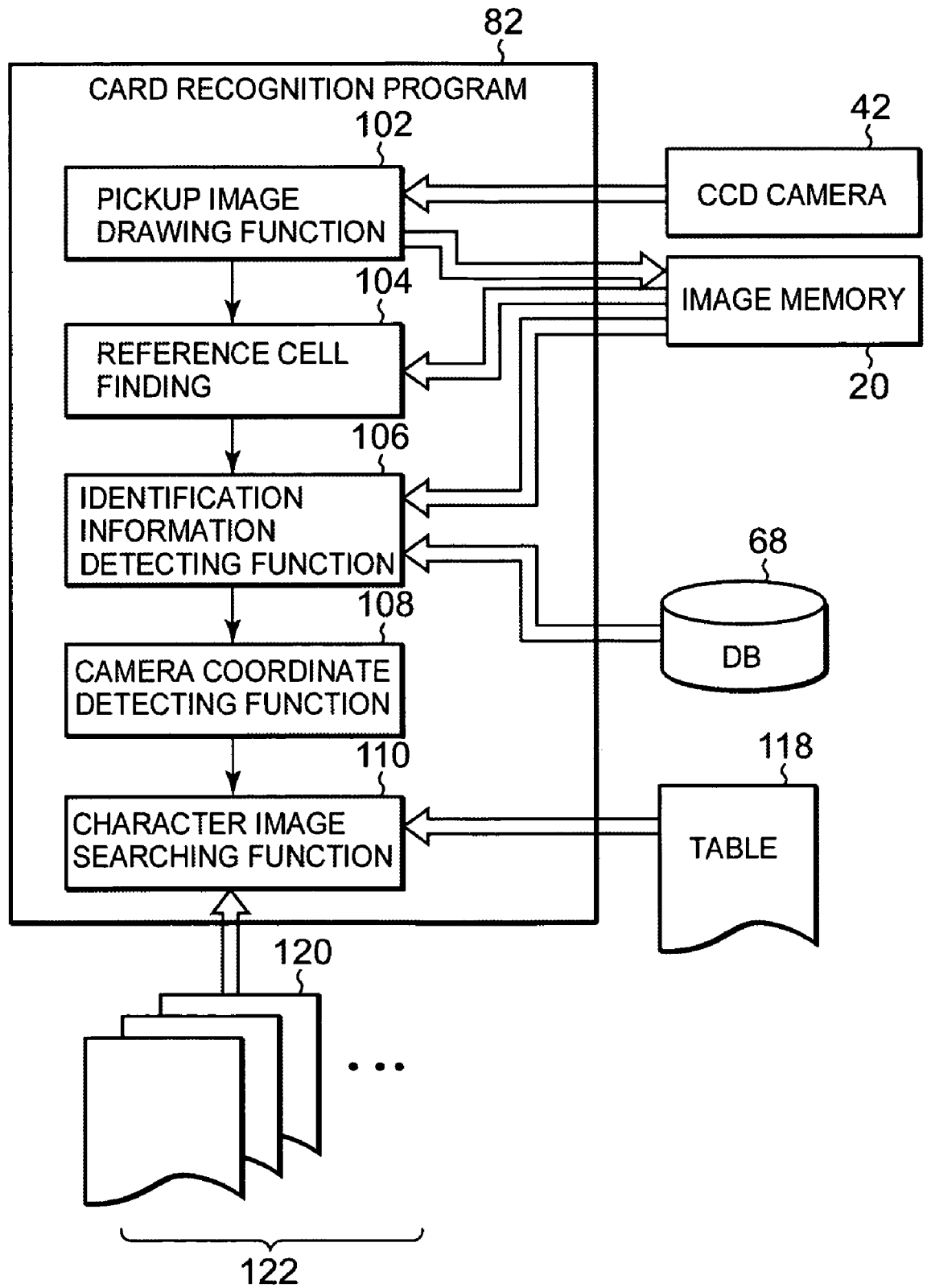
FIG. 6 is a block diagram showing functions of card recognition program.

Firstly, the card recognition program 82 is to perform processing for recognizing the identification image 561 of the card (for example, card 541 in FIG. 3A) placed on the desk, table, or the like 52, so as to specify a character image (for example image 701 in FIG. 3B) to be displayed on the identification image 561. As shown in FIG. 6, the card recognition program 82 includes a pickup image drawing function 102, reference cell finding function 104, identification information detecting function 106, camera coordinate detecting function 108, and character image searching function 110. Here, the term "recognition" indicates to detect an identification number and the orientation of the card 541 from the identification image 561 of the card 541, having been detected from the pickup image data drawn in the image memory 20.

The pickup image drawing function 102 sets up in the image memory 20 an image of an object being picked up as a background image, and draws the image. As one processing for setting the image as the background image, setting Z value in Z-buffering is taken as an example.

As described above, the reference cell finding function 104 finds out image data of the reference cell 62 of the logo part 58 from the image data drawn in the image memory 20 (pickup image data), and detects a position of the image data of the reference cell 62. The position of the image data of the reference cell 62 is detected as a screen coordinate.

Figure 7:
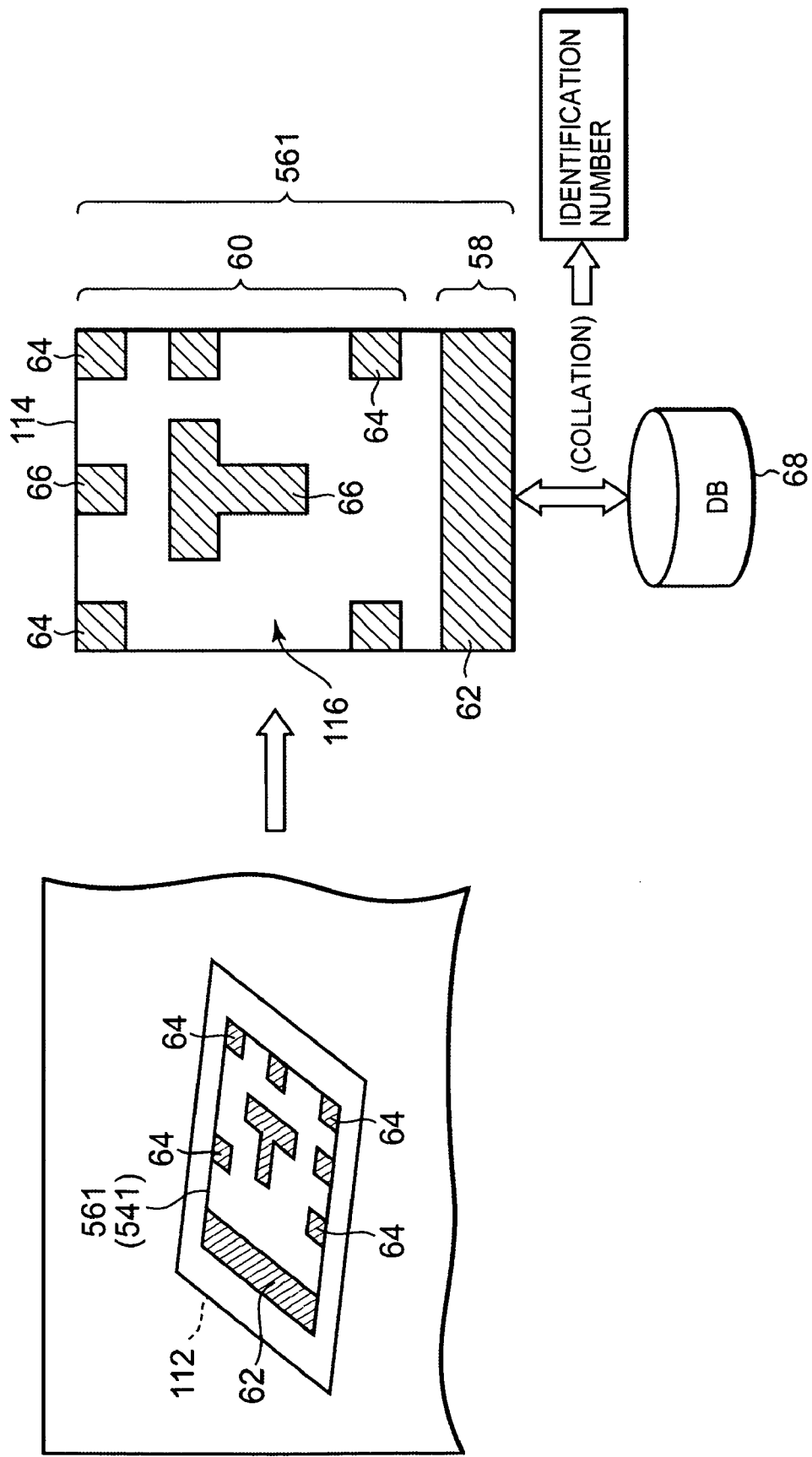
FIG. 7 is an illustration showing a process to detect an identification number from identification image of the card being picked up.

As shown in FIG. 7, the identification information detecting function 106 detects image data of the corner cells 64 based on the position of the image data of the reference cell 62 having been detected. Image data of the area 112 formed by the reference cell 62 and the corner cells 64 is subjected to affine transformation, assuming the image data as being equivalent to the image 114 which is an image viewing the identification image 561 of the card 541 from upper surface thereof, and 2D pattern of the code part 60, that is, code 116 made of 2D patterns of the corner cells 64 and the identification cells 66 is extracted. Then, identification number and the like are detected from thus extracted code 116. As described above, detection of the identification number is carried out by collating the code 116 thus extracted with the 2D code database 68.

Figure 8:
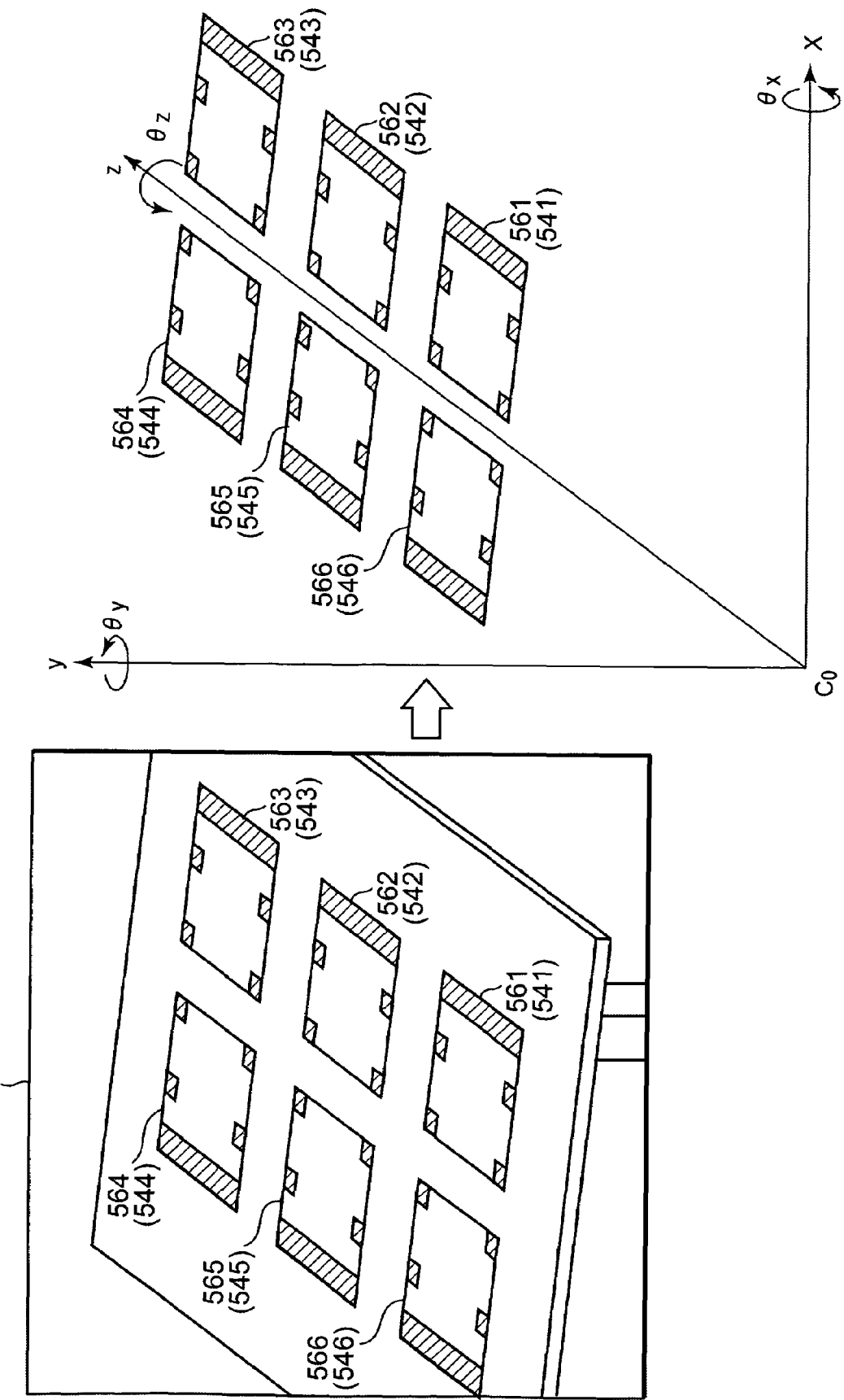
FIG. 8 is an illustration showing a process to obtain a camera coordinate of pickup image based on the pickup image having been captured.

As shown in FIG. 8, the camera coordinate detection function 108 obtains a camera coordinate system (six axial directions: x, y, z, θx, θy and θz) having a camera viewing point C0 as an original point based on the detected screen coordinate and focusing distance of the CCD camera 42. Then, the camera coordinate of the identification image 561 at the card 541 is obtained. At this moment, the camera coordinate at the center of the logo part 58 in the card 541 and the camera coordinate at the center of the code part 60 are obtained.

Since a method for obtaining the camera coordinate of the image from the screen coordinate of the image drawn in the image memory 20, and a method for obtaining a screen coordinate on the image memory 20 from the camera coordinate of a certain image are described in detail in the Patent Document 2 (Japanese Patent Laid-open Publication No. 2000-322602) as mentioned above, it is advised that the Patent Document 2 is referred to.

The character image searching function 110 searches the object information table 118 for a character image (for example, the character image 701 as shown in FIG. 3B), based on the identification number thus detected.

For example as shown in FIG. 9, a large number of records are arranged to constitute elements of the object information table 118, and in one record, an identification number, basic parameters (experiential value, level), a storage head address of character image data (level 1), parameters of level 1 (physical energy, offensive power, defensive power, and the like), a storage head address of character image data (level 2), parameters of level 2 (physical energy, offensive power, defensive power, and the like), a storage head address of character image data (level 3), parameters of level 3 (physical energy, offensive power, defensive power, and the like), and a valid/invalid bit are registered.

As image data, image data corresponding to a level which is one of basic parameters is read out. In other words, if the level is 1, the image data is read out from the storage head address corresponding to level 1, and further, a parameter of level 1 is read out. As to level 2 and level 3, reading is performed in similar manner. The valid/invalid bit indicates a bit to determine whether or not the record is valid. When "invalid" is set, for example, it may include a case that an image of the character is not ready at the current stage, or for example, the character is beaten and killed in a battle which is set in the video game.

The character image searching function 110 searches the object information table 118 for a record associated with the identification number, and if thus searched record is "valid", the image data 120 is read out from the storage head address corresponding to the current level, out of the multiple storage head addresses registered in the record. For instance, image data 120 associated with the character is read out from the storage head address, out of the data file 122 which is recorded in the hard disk 44, optical disk 32, and the like, and in which a large number of image data items are registered. If the record thus searched is "invalid", the image data 120 is not allowed to be read out.

Therefore, when one card 541 is placed on a desk, table, or the like 52, the card recognition program 82 is started, and a character image 701 is identified, which is associated with the identification number and the level (hereinafter, referred to as "identification number, and the like"), specified by the identification image 561 of the card 541 thus placed. If the character image is not changed according to the level, in each record in the object information table 118, only one storage head address is registered as to the image 120. Therefore, in such a case, the character image 701 associated with the identification number is specified by the identification image 561 of the card 541.

According to the card recognition program 82, it is possible to exert a visual effect merging the real space and the virtual space. Then, control is passed from this card recognition program 82 to various application programs (character appearance display program 84, character action display program 86, the first card position forecasting program 88, the second card position forecasting program 90, and the like).

Character Appearance Display Program

Figure 10:
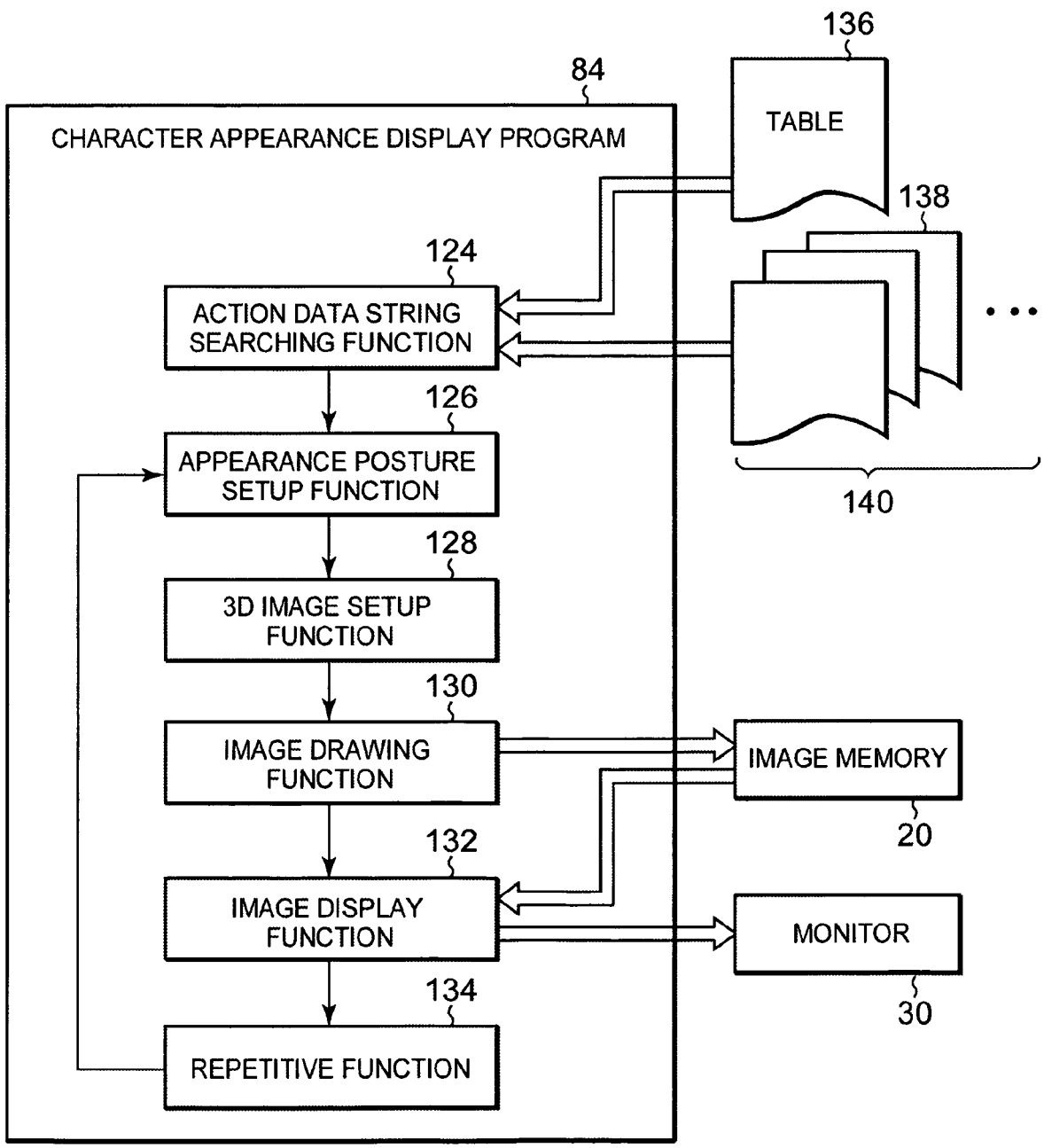
FIG. 10 is an illustration showing elements of character appearance display program.

The character appearance display program 84 creates a display that a character image 701 associated with the identification number and the like which are specified by the identification image 561 of the detected card (for example, card 541), appears in such a manner as being superimposed on the identification image 561 of the card 541. As shown in FIG. 10, the character appearance display program 84 includes an action data string searching function 124, an appearance posture setup function 126, 3D image setup function 128, image drawing function 130, image displaying function 132, and repetitive function 134.

The action data string searching function 124 searches the appearance action information table 136 for an action data string for displaying a scene in which the character appears, based on the identification number and the like. Specifically, at first, the action data string searching function 124 searches the appearance action information table 136 for a record associated with the identification number and the like, the table being recorded in the hard disk 44, optical disk 32, or the like, and registering a storage head address of action data string for each record. Then, the action data string searching function 124 reads out from the storage head address registered in the record thus searched, an action data string 138 representing an action where the character image 701 appears, out of the data file 140 which is recorded in the hard disk 44, optical disk 32, or the like, and a large number of action data strings 138 are registered.

The appearance posture setup function 126 sets one posture in a process where the character image 701 appears. For example, based on the action data of i-th frame (i=1, 2, 3 ...) of the action data string 138 thus readout, vertex data of the character image 701 is moved on the camera coordinate system, so that one posture is setup.

The 3D image setup function 128 sets up a three-dimensional image of one posture in a process where the character image 701 appears on the identification image 561 of the card 541, based on the camera coordinate of the identification image 561 of the card 541 thus detected.

The image drawing function 130 allows the three-dimensional image of one posture in a process where the character image 701 appears to be subjected to a perspective transformation into an image on the screen coordinate system, and draws thus transformed image in the image memory 20 (including a hidden surface processing). At this timing, Z value of the character image 701 in Z-buffering is reconfigured to be in the unit of frame, thereby presenting a scene where the character image 701 gradually appears from below the identification image 561 of the card 541.

The image display function 132 outputs the image drawn in the image memory 20 in a unit of frame to the monitor 30 via the I/O port 22, and displays the image on the screen of the monitor 30.

The repetitive function 134 sequentially repeats the processing of the appearance posture setup function 126, the processing of the 3D image setup function 128, the processing of the image drawing function 130, and the processing of the image display function 132. Accordingly, it is possible to display a scene where the character image 701 associated with the identification number and the like of the card 541 appears on the identification image 561 of the card 541.

Character Action Display Program

Figure 11:
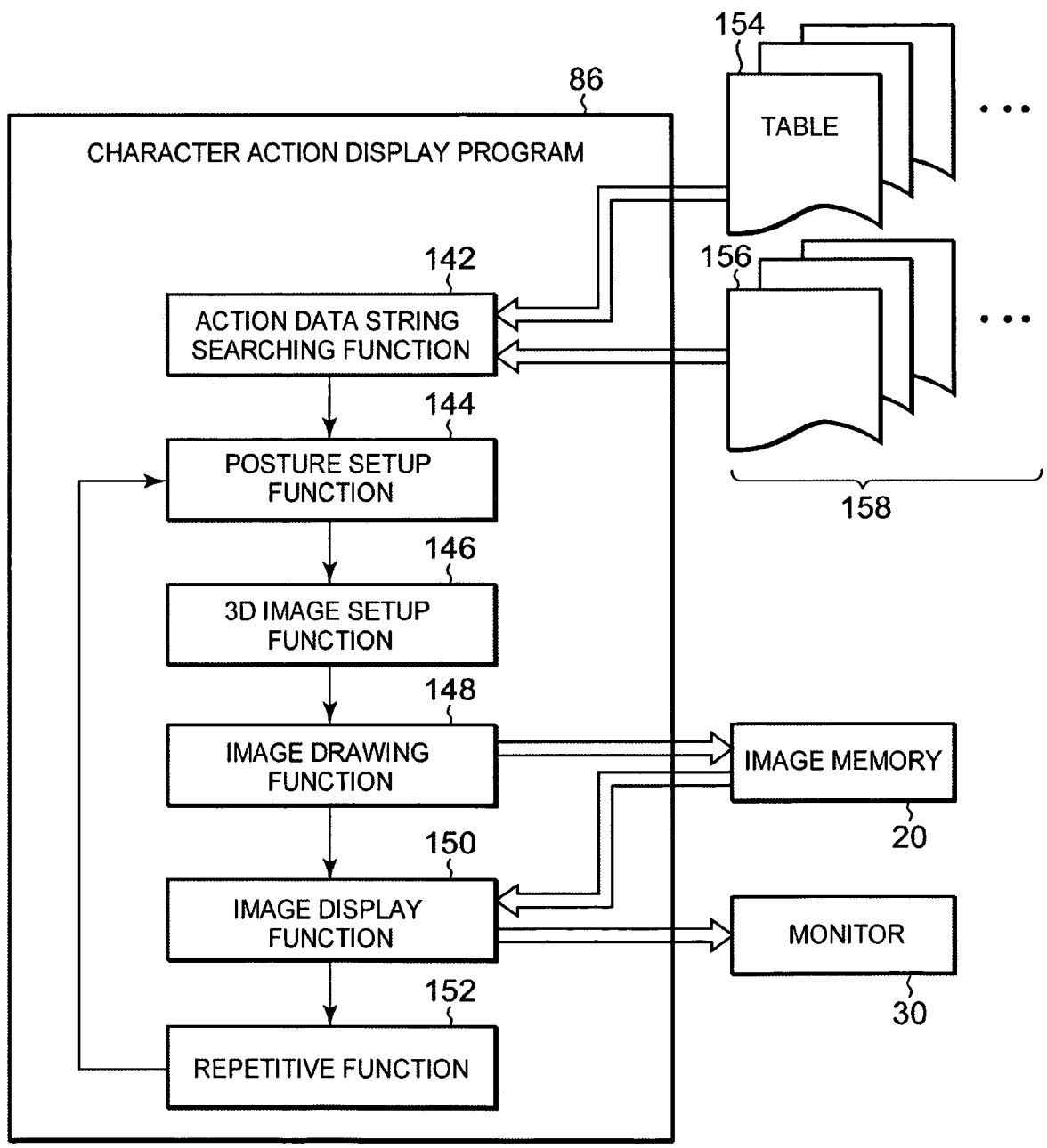
FIG. 11 is a block diagram showing functions of character action display program.

The character action display program 86 is to display a scene where the character performs following actions; waiting, attacking, enchanting, protecting another character, and the like. As shown in FIG. 11, being almost similar to the aforementioned character appearance display program 84, the character action display program 86 includes, action data string searching function 142, posture setup function 144, 3D image setup function 146, image drawing function 148, image display function 150, and repetitive function 152.

The action data string searching function 142 searches various action information tables 154 associated with each scene, for an action data string to display the scene where the character performs following actions; waiting, attacking, enchanting, and protecting another character.

Specifically, at first, an action information table 154 associated with the action to be displayed is identified from the various action information tables 154, which are recorded for example in the hard disk 44, optical disk 32, and the like, and in which a storage head address of action data string is registered for each record. Furthermore, the action data string searching function 142 searches thus identified action information table 154 for a record associated with the identification number and the like.

Then, out of the data file 158 which is recorded in the hard disk 44, optical disk 32, or the like and in which a large number of action data strings 156 are registered, the action data string searching function 142 reads out from the head address registered in the record thus searched, the action data string 156 which is associated with the action to be displayed for this time (the character's action, such as waiting, attacking, enchanting, or protecting another character).

The posture setup function 144 sets, for example as to a character regarding the card 541, one posture in a process while the character image 701 is waiting, one posture in a process while the character image is attacking, one posture in a process while the character image is enchanting, and one posture in a process while the character image is protecting another character. For instance, based on the action data of the i-th frame (i=1, 2, 3 ...) of the action data string 156 thus read out, the vertex data of the character image 701 is moved on the camera coordinate system and one posture is set up.

The 3D image setup function 146 sets three-dimensional images of one posture on the identification image 561 of the card 541, in a process while the character image 701 is waiting, one posture in a process while the character image is attacking, one posture in a process while the character image is enchanting, and one posture in a process while the character image is protecting another character, based on the camera coordinate of the identification image 561 on the card 541 thus detected.

The image drawing function 148 allows the 3D images of one posture in a process while the character image 701 is waiting, one posture in a process while the character image is attacking, one posture in a process while the character image is enchanting, and one posture in a process while the character image is protecting another character, to be subjected to perspective transformation into images on the screen coordinate system, and draws thus transformed images into the image memory 20 (including hidden surface processing).

The image display function 150 outputs the image drawn in the image memory 20 in a unit of frame to the monitor 30 via the I/O port 22, and displays the image on the screen of the monitor 30.

The repetitive function 152 sequentially repeats the processing of the posture setup function 144, the processing of the 3D image setup function 146, the processing of the image drawing function 148, and the processing of the image display function 150. Accordingly, it is possible to display scenes where the character image 701 is waiting, attacking, enchanting, and protecting another character.

With the aforementioned card recognition program 82, the character appearance display program 84, and the character action display program 86, it is possible to allow a character in a card game to appear in a scenario of a video game, and perform various actions. In other words, a card game which has been enjoyed only in a real space can be spread to the virtual space, thereby offering a new type of game merging the card game and the video game.

Next, the first card position forecasting program 88 will be described. As shown in FIG. 12, the program 88 is configured assuming a case where three cards are placed side by side for example.

Figure 12A:
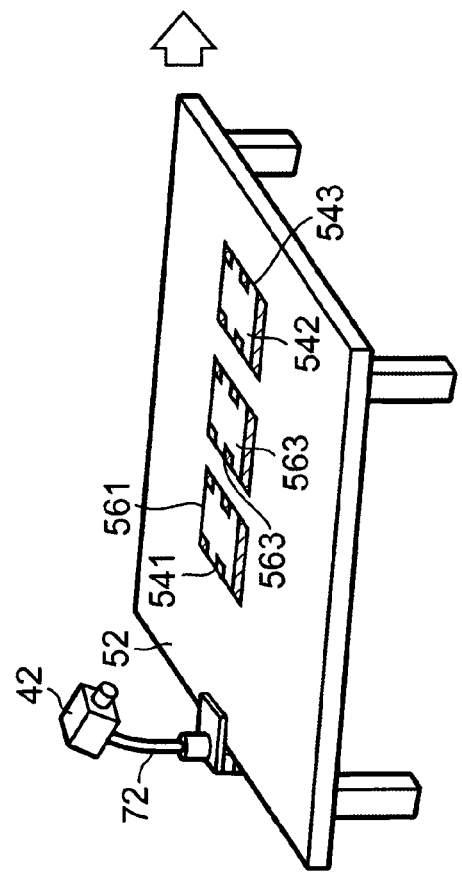
FIG. 12A and FIG. 12B are illustrations showing an example of usage pattern to explain the first card position forecasting program.
Figure 12B:
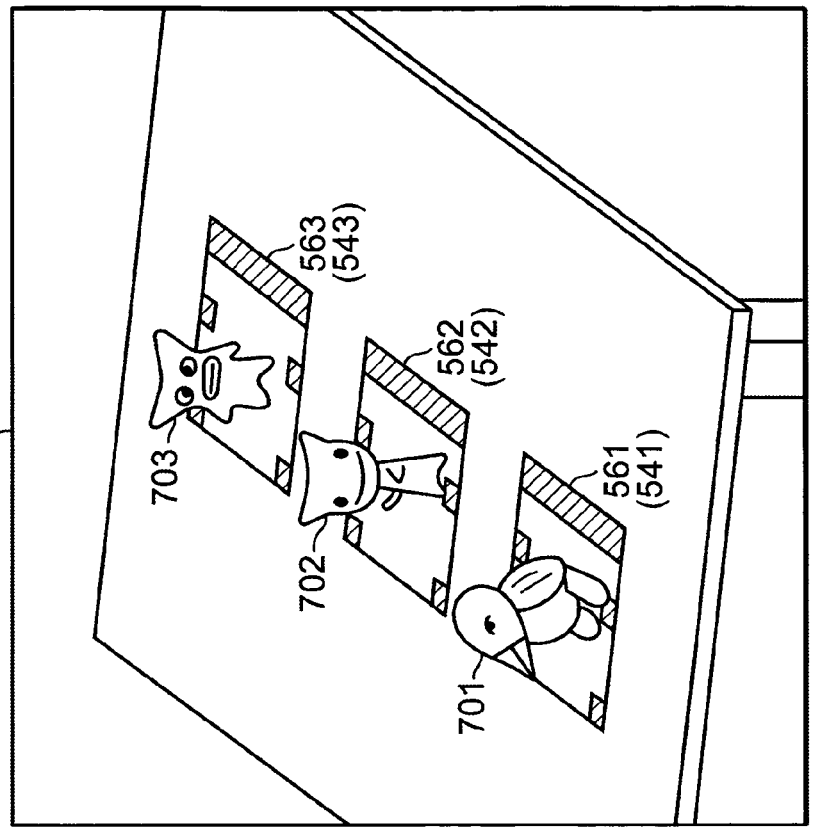
Figure 13B:
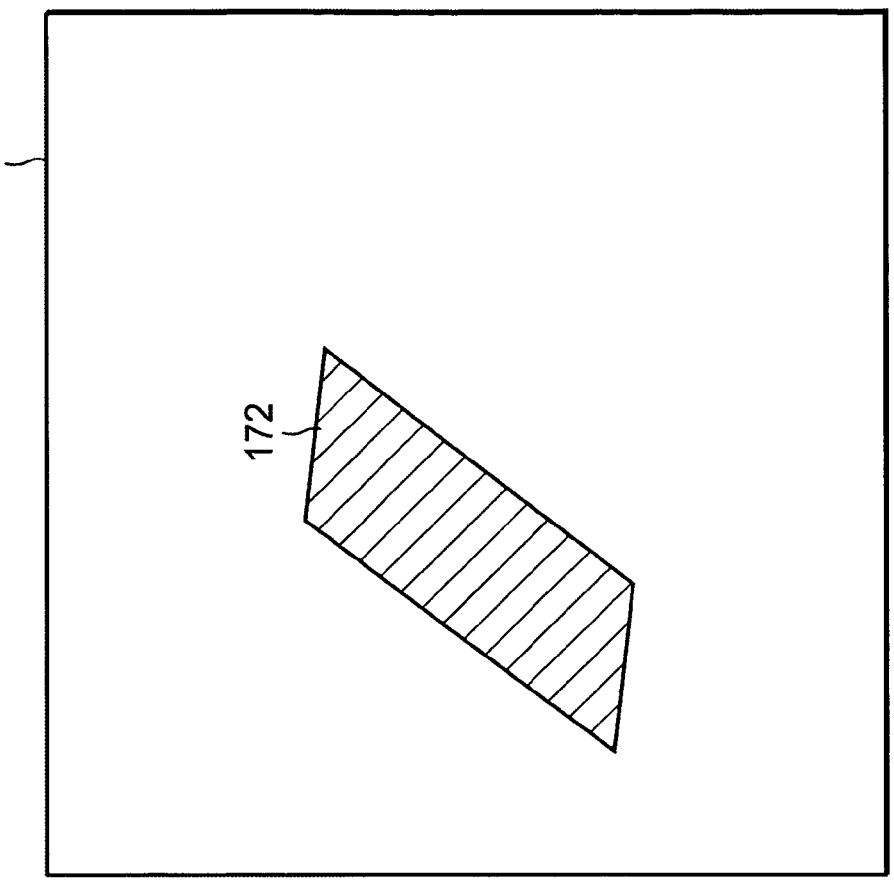
Figure 13A:
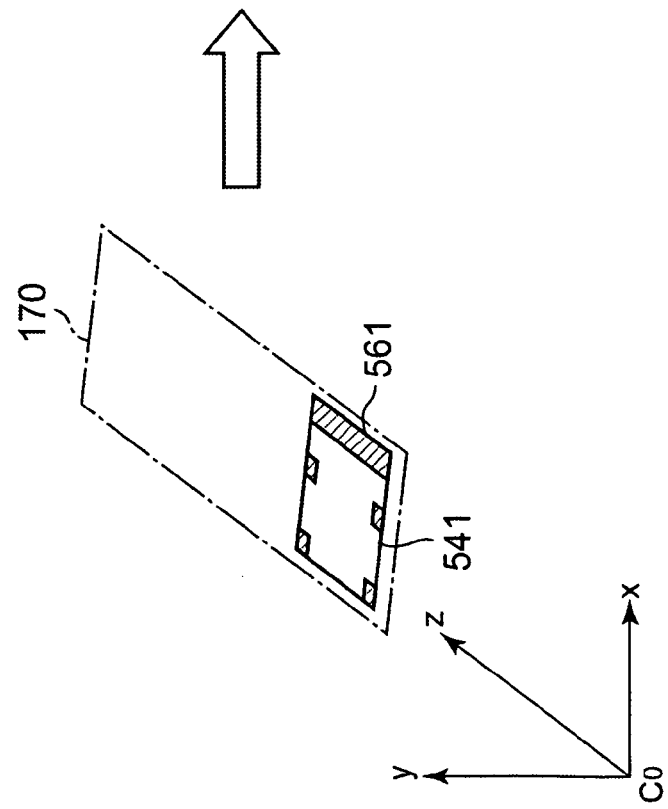
Figure 14:
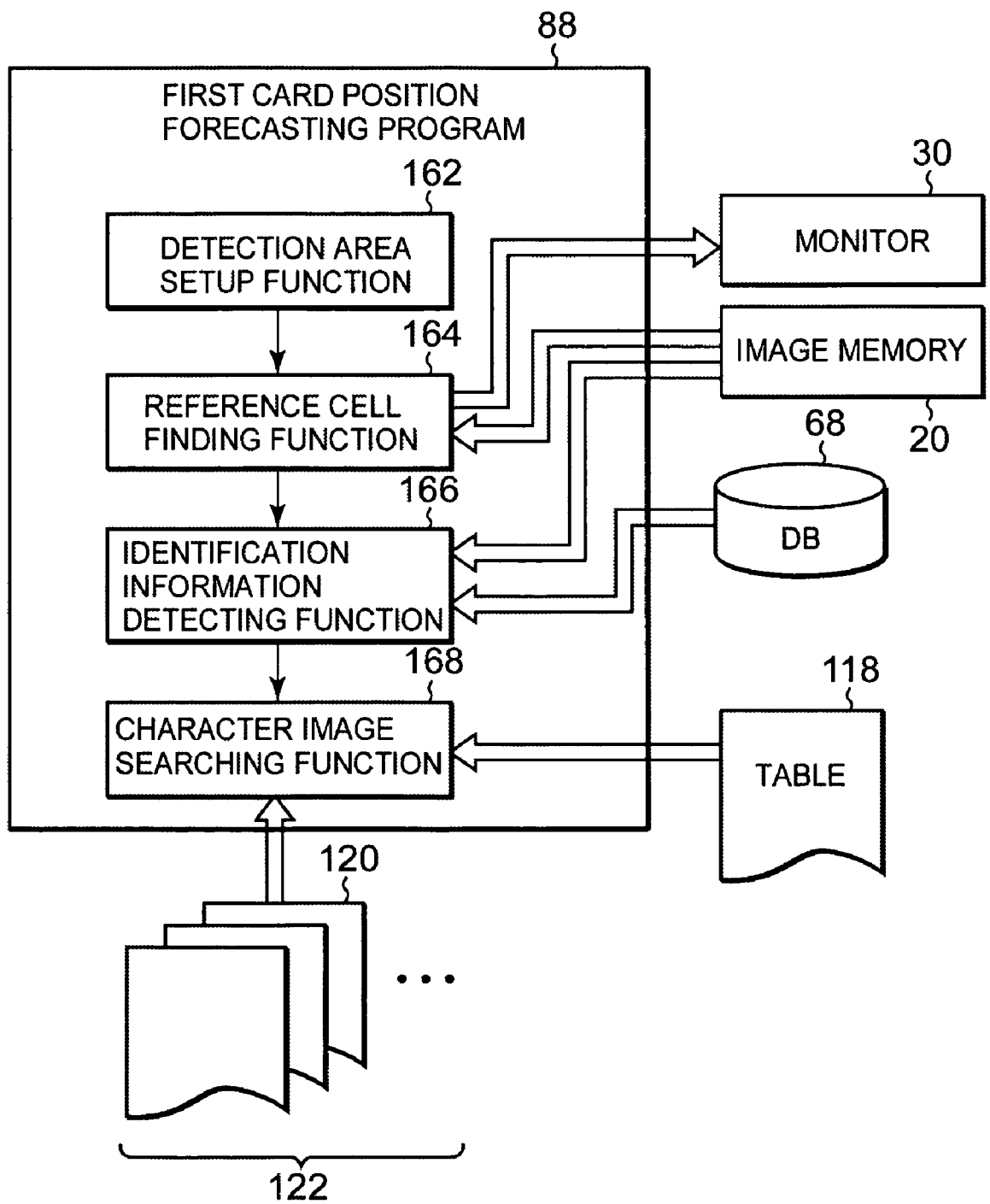
FIG. 14 is a block diagram showing functions of the first card position forecasting program.

As shown in FIG. 13A, when the aforementioned card recognition program 82 detects a position of the identification image 561 of one card 541, based on this identification image 561, the first card position forecasting program 88 forecasts placing positions of the other cards 542 and 543 (see FIG. 12). As shown in FIG. 14, the program 88 includes detection area setup function 162, reference cell finding function 164, identification information detecting function 166, and character image searching function 168.

Here, processing operations of the first card position forecasting program 88, in particular, as shown in FIG. 13A, operations after the camera coordinate of the identification information 561 of one card 541 is detected by the card recognition program 82, for example, will be explained with reference to FIG. 15.

Figure 15:
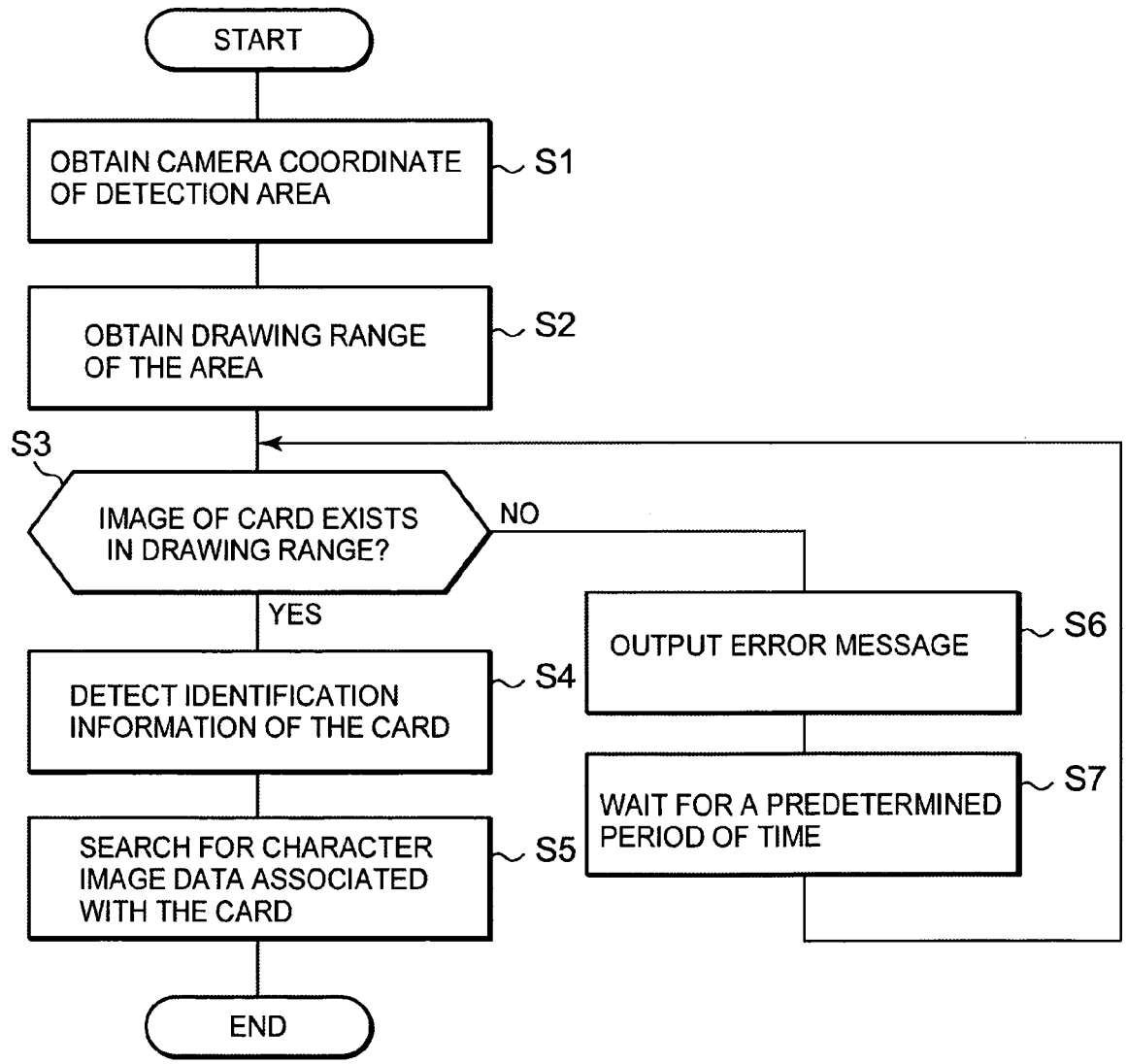
FIG. 15 is a flow chart showing a processing of the first card position forecasting program.

In step S1 of FIG. 15, the detection area setup function 162 obtains the camera coordinate of the detection area 170 being a certain range including the identification image 561 as shown in FIG. 13A, based on the camera coordinate of the identification image 561 being one detected image. This detection area 170 is a rectangular area if multiple cards are placed side by side.

Thereafter, in step S2, a drawing range 172 of the detection area 170 on the image memory 20 is obtained based on the camera coordinate of detection area 170 thus obtained.

Then, in step S3, the reference cell finding function 164 determines whether or not image data of the reference cell 62 exists in the drawing range 172 of the detection area 170 in the image memory 20.

If the image data of the reference cell 62 exists, as shown in FIG. 12A for example, assuming the case where two cards 542 and 543 are arranged in the lateral direction on the side of the card 541, the processing proceeds to step S4 in FIG. 15, and the identification information detecting function 166 allows the image data of the region formed by the reference cell 62 and the corner cells 64 to be subjected to affine transformation. Then, the identification numbers associated with the cards 542 and 543 respectively based on the identification images 562 and 563 of the cards 542 and 543 are detected. Detection of the identification number is carried out by collating the codes extracted from the identification images 562 and 563 with the 2D code database 68.

Then, in step S5, the character image searching function 168 searches the object information table 118 for character image data 120 based on each of the identification number and the like of the cards 542 and 543. For example, records respectively associated with the identification numbers are searched out from the object information table 118, and if these records thus searched out are "valid", the image data 120 is read out from the storage head address corresponding to the current level out of the multiple storage head addresses registered in each of the records.

On the other hand, in step S3, if it is determined that the identification images of the reference cell 62 does not exist, the reference cell finding function 164 proceeds to step S6, and outputs on the screen of the monitor 30, an error message prompting to place all the cards. Then, after waiting for a predetermined period of time (for example, three seconds) in step S7, the processing returns to step S3 and aforementioned processing is repeated.

Then, at the stage where all the character images 701 to 703 are determined with respect to all the cards existing in the detection area, the processing operations as described above are completed.

Also in this case, as shown in FIG. 12B, by staring the character appearance display program 84, for example, a scene is displayed in which the character images 701 to 703 associated with the identification numbers of the cards 541 to 543 appear on the identification images 561 to 563 of the cards 541 to 543 respectively.

In the first card position forecasting program 88, recognition of the multiple cards 542 and 543 is carried out for the detection area 170 that is set up based on the position of the identification image 561 of one card 541 having already been detected. Therefore, it is not necessary to detect all over the image memory 20 again in order to recognize the multiple cards 542 and 543, thereby reducing loads in the process to recognize the multiple cards 542 and 543. This will enhance the speed of processing.

Next, the second card position forecasting program 90 will be explained. As shown in FIG. 3A, the program 82 is configured assuming a case where two persons respectively place three cards side by side for example, and the two persons initially place the first cards 541 and 544 respectively on the left, that is, diagonally.

Figure 16:
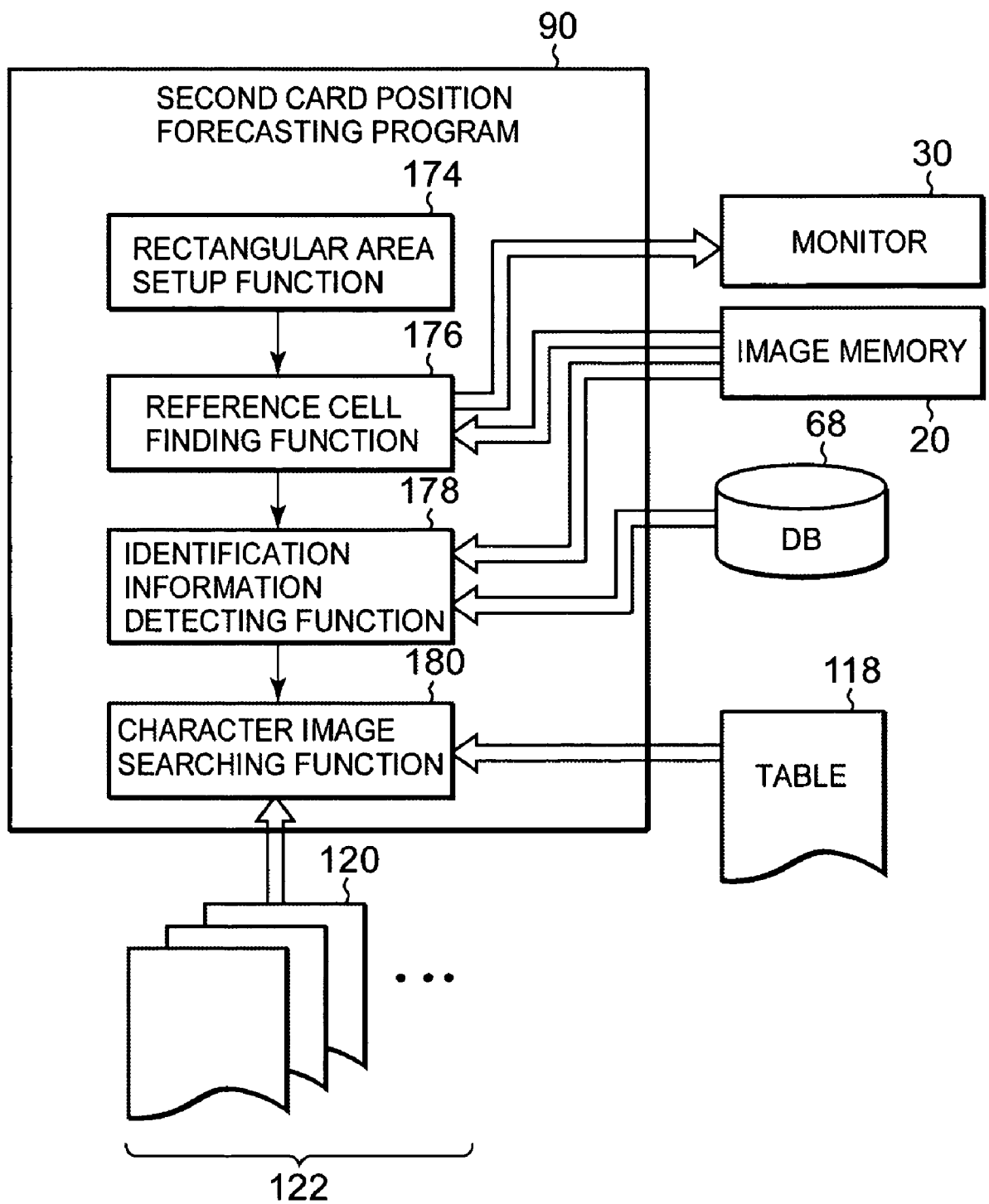
FIG. 16 is a block diagram showing functions of the second card position forecasting program.

The second card position forecasting program 90 forecasts positions of other cards, when two cards are placed diagonally and as shown in FIG. 16, the program 90 includes, rectangular area setup function 174, reference cell finding function 176, identification information detecting function 178, and character image searching function 180.

Figure 17B:
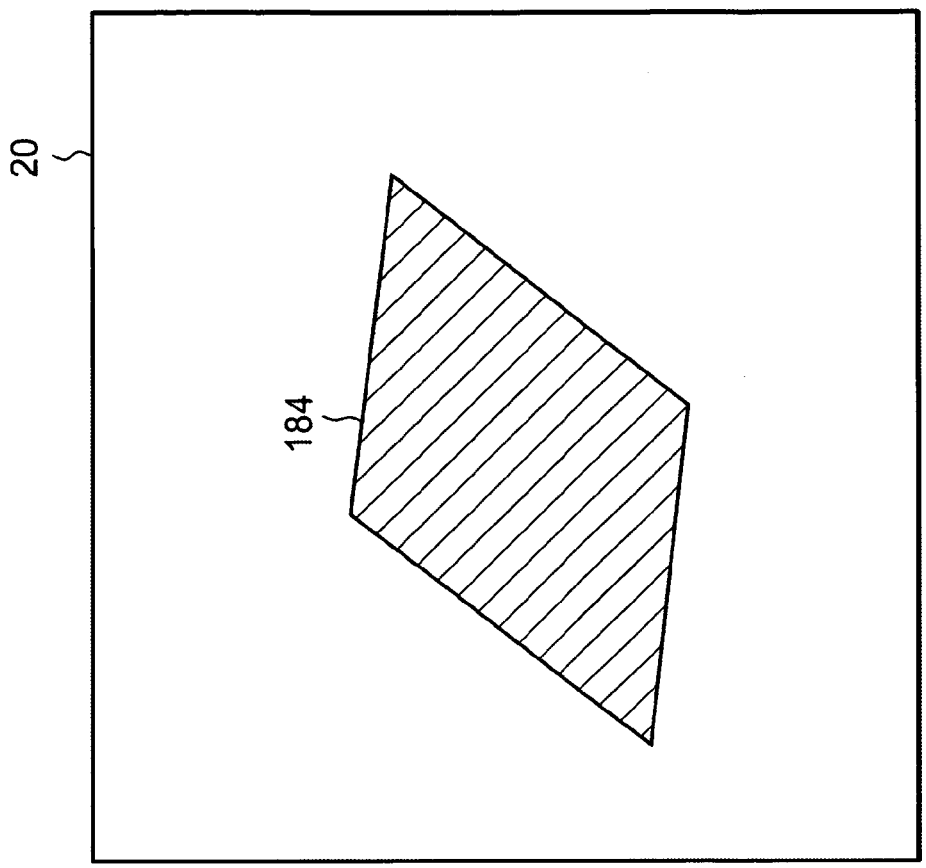
FIG. 17A and FIG. 17B are illustrations to show a process to obtain a rectangular area based on the two cards placed diagonally.
Figure 17A:
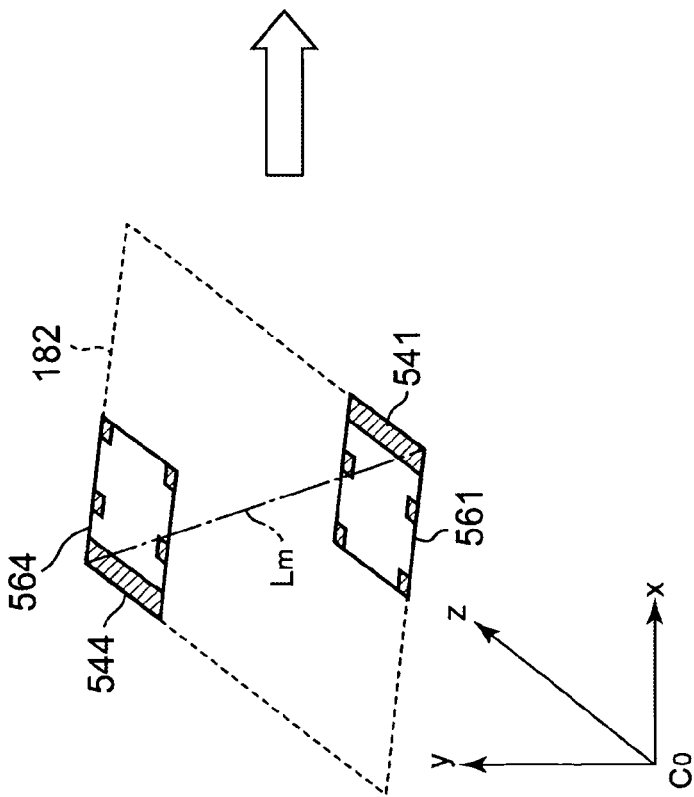

Here, processing operations of the second card position forecasting program 90 will be explained with reference to FIG. 18, in particular the operations, after the camera coordinates of the identification images 561 and 564 of the two cards 541 and 544 placed diagonally on the diagonal line Lm are detected, for example, by the card recognition program 82, as shown in FIG. 17A.

Figure 18:
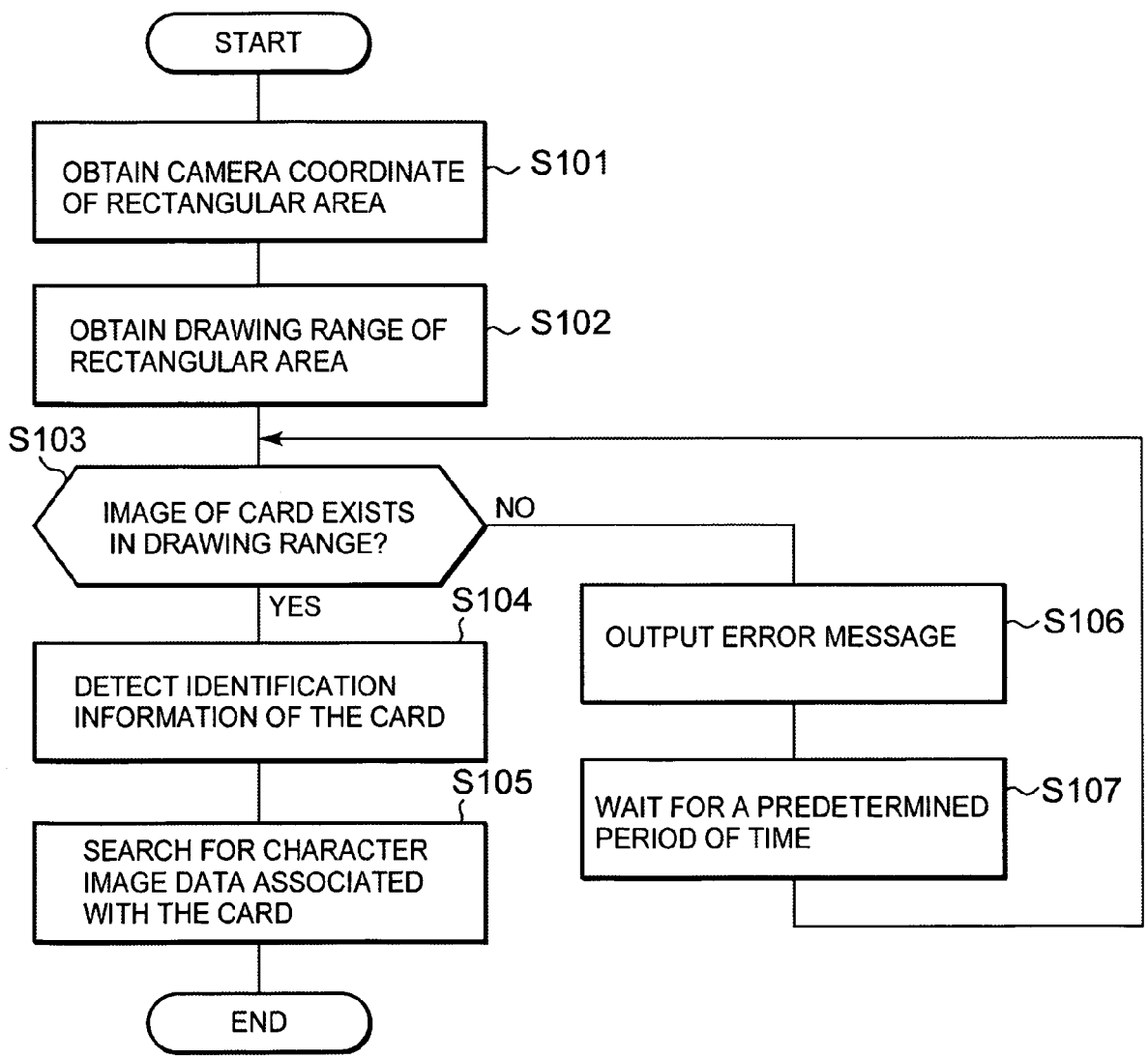
FIG. 18 is a flow chart showing a processing of the second card position forecasting program.

In step S101 of FIG. 18, as shown in FIG. 17A, the rectangular area setup function 174 obtains camera coordinate of the rectangular area 182 including the diagonal line Lm, based on the camera coordinates of the identification images 561 and 564 of the two cards 541 and 544 placed on the diagonal line Lm.

Thereafter, in step S102, as shown in FIG. 17B, drawing range 184 of the rectangular area 182 on the image memory 20 is obtained, from the camera coordinate of the rectangular area 182 thus obtained. Then, in step S103, the reference cell finding function 176 determines whether or not the image data of the reference cell 62 exists in the drawing range 184 of the rectangular area 182 in the image memory 20.

If the image data of the reference cell 62 exists, as shown in FIG. 3A for example, assuming the case where two cards 542 and 543 are arranged in the lateral direction on the side of the card 541 and two cards 545 and 546 are arranged in the lateral direction on the side of the card 544, the processing proceeds to step S104 in FIG. 18. Then, the identification information detecting function 178 allows the image data of the region formed by the reference cell 62 and the corner cells 64 to be subjected to affine transformation.

Then, identification numbers associated with the cards 542, 543, 545, and 546 are detected based on the identification images 562, 563, 565, and 566 of the remaining cards 542, 543, 545, and 546, respectively. Detection of the identification numbers is carried out by collating the codes extracted from the identification images 562, 563, 565, and 566 with the 2D code database 68.

Thereafter, in step S105, the character image searching function 180 searches the object information table 118 for character image data 120 based on each of the identification number and the like of the cards 542, 543, 545, and 546. For example, records respectively associated with the identification numbers are searched out, and if these records thus searched out are "valid", the image data 120 is read out from the storage head address corresponding to the current level out of the multiple storage head addresses registered in each of the records.

On the other hand, in step S3, if it is determined that the identification images 562, 563, 565 and 566 of the remaining cards 542, 543, 545 and 546 do not exist, the reference cell finding function 176 proceeds to step S106, and outputs on the screen of the monitor 30, an error message prompting to place all the cards 542, 543, 545 and 546. Then, after waiting for a predetermined period of time (for example, three seconds) in step S107, the processing returns to step S103 and the above processing is repeated.

Then, at the stage where all the character images 701 to 706 are determined with respect to all the cards 541 to 546 existing in the detection area 182, the processing operations as described above are completed.

Also in this case, by staring the character appearance display program 84, for example, a scene is displayed in which the character images 701 to 706 associated with the identification numbers and the like of the cards 541 to 546 appear on the identification images 561 to 566 of the cards 541 to 546 respectively.

In the second card position forecasting program 90, recognition of the multiple cards 542, 543, 545, and 546 is carried out for the detection area 182 that is formed by the two cards 541 and 544 placed on the diagonal line Lm, and after the two cards 541 and 544 placed on the diagonal line Lm are recognized, the other cards 542, 543, 545, and 546 are recognized. Therefore, it is not necessary to detect all over the image memory 20 again in order to recognize the multiple cards 542, 543, 545, and 546, thereby reducing loads in the process to recognize the multiple cards 542, 543, 545, and 546.

In the first and the second card position forecasting programs 88 and 90 as described above, it is possible to prepare multiple information tables (card placement information table, not illustrated) indicating the placement of the cards 541 to 546, in association with multiple versus-fighters, respectively. Then, every time when the camera coordinates of the identification images 561 to 566 of the cards 541 to 546, and the identification numbers of the card 541 to 546 are detected, those data may be registered to the associated card placement information table.

In this case, at the stage where all the camera coordinates of the cards 541 to 546 placed on the desk, table, or the like 52 are registered in the card placement information table, subsequently, it is also possible to recognize (re-recognize) the cards 541 to 546 based on the camera coordinates registered in the card placement information table.

In the case where the versus-fighters respectively arrange three cards, for example, side by side, it is also possible to decide one processing procedure uniquely for each of the versus-fighters, by placing the three cards in such a manner as changing orientation of each card.

With respect to the three cards 541 to 543, for example, a character to perform action is identified according to the orientation of the card 541 placed on the left, a counterpart character to be influenced by the action is identified according to the orientation of the card 542 placed at the center, and the action is identified according to the orientation of the card placed on the right.

In other words, if a character that performs action is specified by the orientation of the card 541 placed on the left, when the card 541 is oriented to the left, the character image 701 associated with the card 541 is selected. When the card 541 is oriented upwardly, the character image 702 associated with the card 542 at the center is selected. When the card 541 is oriented to the right, the character image 703 associated with the card 543 on the right is selected. When the card 541 is oriented downwardly, three character images 701 to 703 are selected respectively associated with the three cards 541 to 543.

If a counterpart character is specified by the orientation of the card 542 placed at the center, when the card 542 is oriented to the left, a character image 704 associated with the counterpart card 544 is selected. When the card 542 is oriented to upwardly, the character image 705 associated with the counterpart card 545 at the center is selected. When the card 542 is oriented to the right, the character image 706 associated with the counterpart card 546 on the right is selected. When the card 542 is oriented downwardly, an image of the character selected by the orientation of own card 541 placed on the left.

If an action is specified by the orientation of the card 543 placed on the right, when the card 543 is oriented to the left, "to attack" is selected, when it is oriented upwardly, "to enchant" is selected, when it is oriented to the right, "to be defensive" is selected, and when it is oriented downwardly, "to protect" is selected.

If the processing is performed based on the placed card orientation as thus described, it is possible to give a command regarding various processing according to a combination of orientations of the multiple cards 541 to 543, without using an operation device (a device to input a command via key operations).

Next, the image motion detecting program 92 will be explained. This program 92 obtains a difference between image data picked up at a predetermined timing and image data picked up at a timing different from the predetermined timing, and an image having moved is specified based on the data obtained as a difference. Then, it is determined whether or not thus identified image (such as image of user's hand) comes into contact with a character image, and if there is a contact therebetween, a parameter associated with the character is changed.

Figure 19:
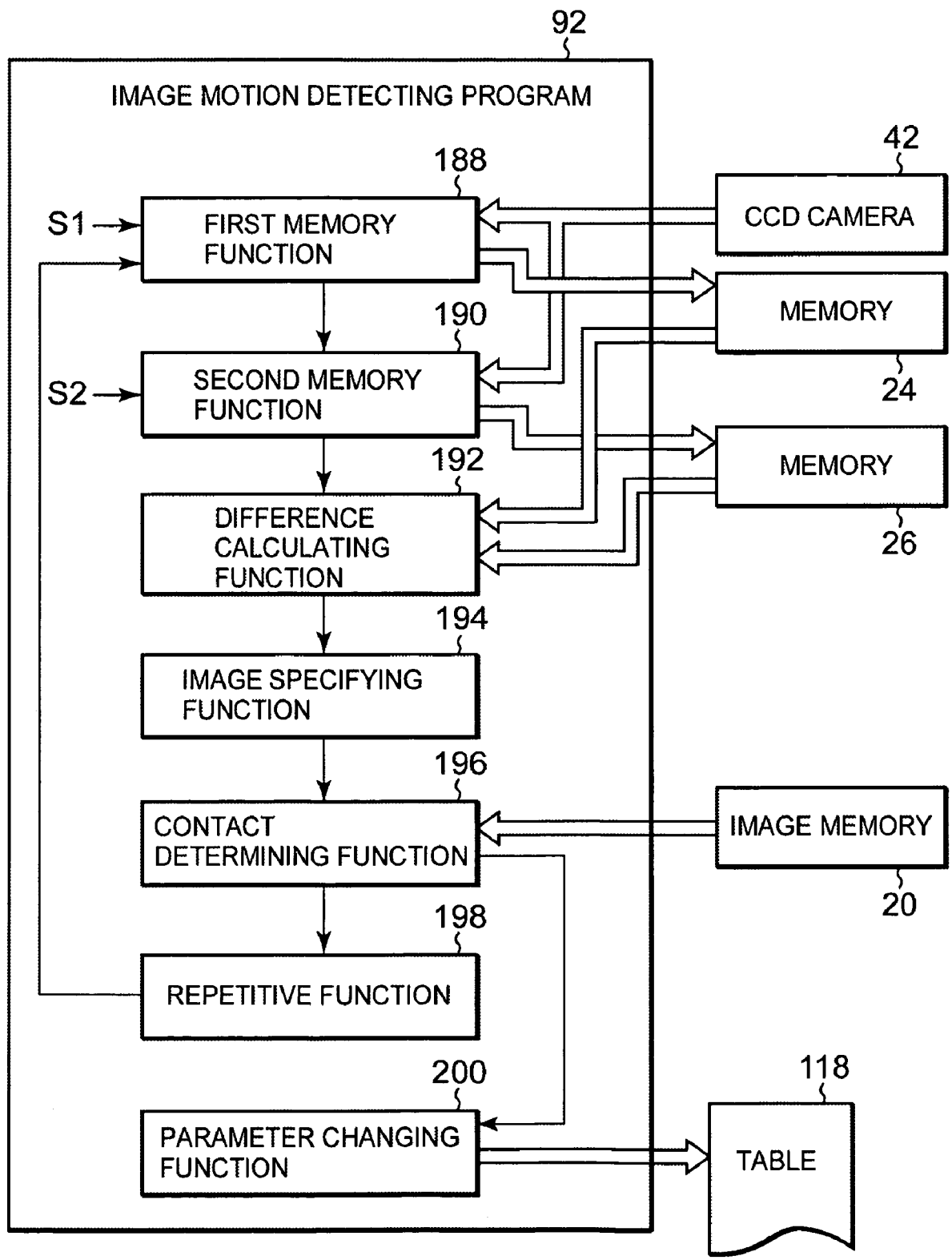
FIG. 19 is a block diagram showing functions of image motion detecting program.

As shown in FIG. 19, this program 92 includes the first memory function 188, the second memory function 190, difference calculating function 192, image specifying function 194, contact determining function 196, repetitive function 198, and parameter changing function 200.

Figure 20B:
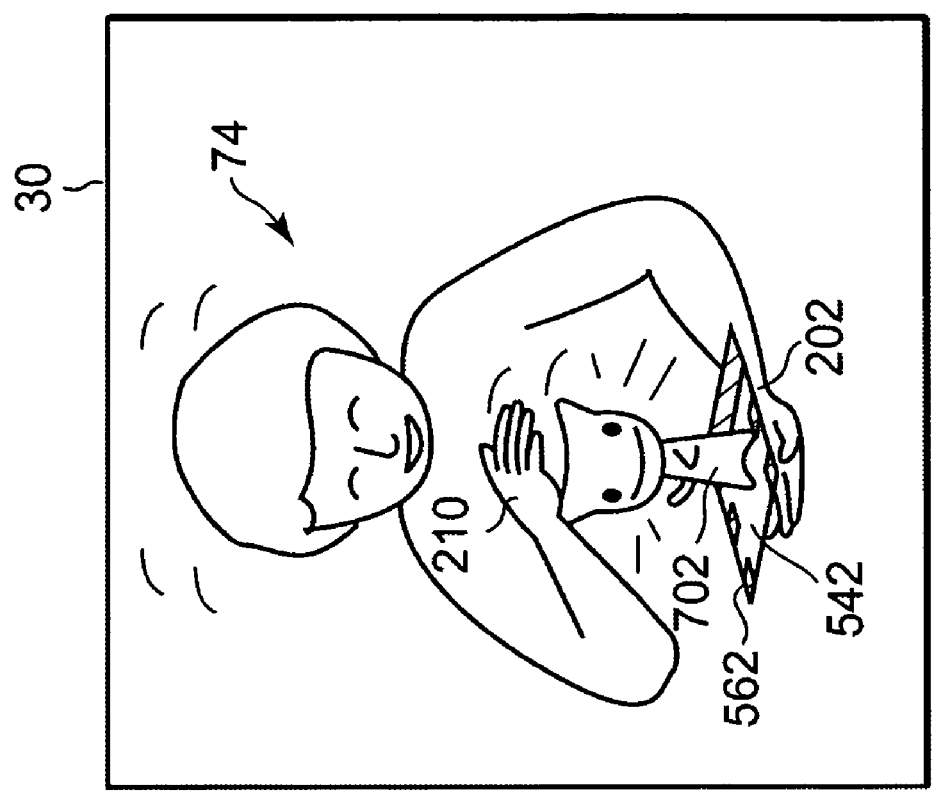
FIG. 20A and FIG. 20B are illustrations showing a status where a user holds the card on a hand, and a status where a character image is displayed together with the pickup image on a monitor.
Figure 20A:
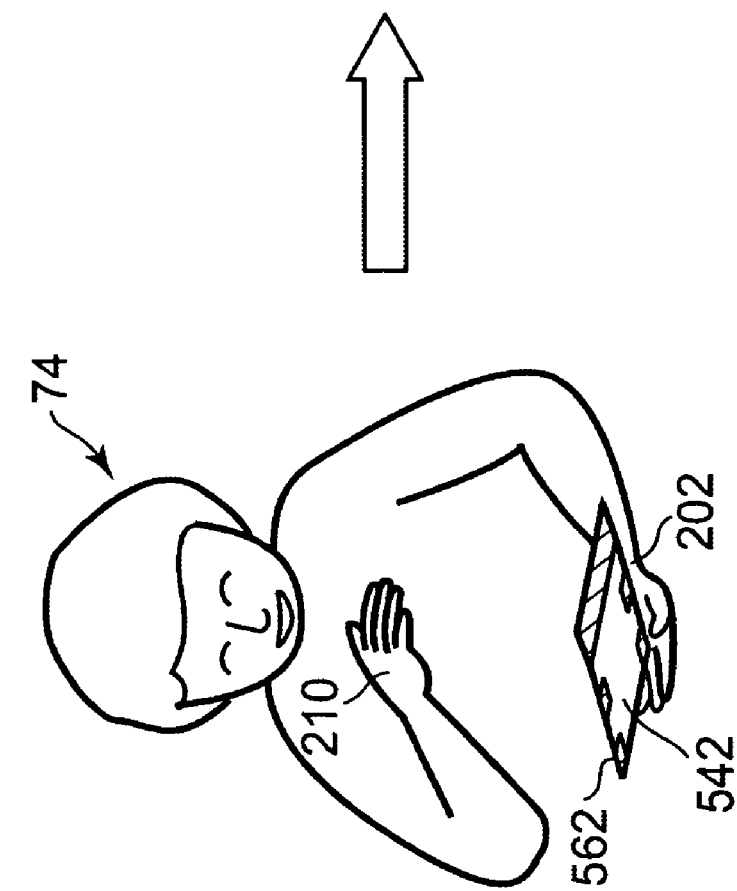

Operations of the program 92 will be explained with reference to FIG. 19 to FIG. 21, for example, the operations being subsequent to an action as shown in FIG. 20A in which the user 74 holds one card 542 on one hand 202, and the character image 702 associated with the identification number of the card 542 appears on the identification image 562 of the card 542 in the screen of the monitor 30.

Firstly, the first memory function 188 captures pickup image data 204 from the CCD camera 42 based on a timing for inputting the first differential signal S1 and stores the data into the first memory for difference 24. The timing for inputting the first differential signal S1 can be arbitrarily set up.

The second memory function 190 captures pickup image data 206 from the CCD camera 42 based on a timing for inputting the second differential signal S2 and stores the data into the second memory for difference 26. The timing for inputting the second differential signal S2 can also be arbitrarily set up and it may be the timing of one frame, two frames, five frames, or the like, after the first differential signal S1.

As shown in FIG. 21, the difference calculating function 192 obtains a difference between the pickup image data 204 stored in the first memory for difference 24, and the pickup image data 206 stored in the second memory for difference 26. For example, it is possible to perform a processing such as subtracting the pickup image data 204 stored in the first memory for difference 24 from the pickup image 206 stored in the second memory for difference 26.

The image specifying function 194 specifies an image having moved based on the data obtained as a difference 208. The data obtained as a difference 208 is assumed to be data in a unit of one pixel or some pixels and each dispersed in a shape of island. Here, as to the data obtained as a difference 208, a large cluster data including at least 100 pixels may be extracted, and thus extracted data is identified as an image having moved.

FIG. 21 shows an example three images 208a to 208c indicate images which have moved. Here, the term "specifying" means that a recording range of the data 208a to 208c thus extracted is detected as a screen coordinates.

The contact determining function 196 determines as to at least one images 208a to 208c having moved, whether or not there exists an image 208c that represents touching the character image 702, based on the screen coordinates of the images 208a to 208c having moved, respectively, and the character image 702 drawn in the image memory 20.

It is determined that there has been an image touching the character image 702, if any part of the screen coordinates of the respective images (208a to 208c) having moved and a part of the screen coordinate of the character image 702 (the screen coordinate on the image memory 20) agree with each other. In the example of FIG. 21, the image 208c corresponds to this image touching the character image.

If an image having moved is only one (for example, image 208c), this contact determining function 196 determines whether or not the image 208c having moved touches the character image 702. If a part of the screen coordinate of the image 208c having moved and a part of the screen coordinate of the character image 702 agree with each other, it is determined that there has been an image touching the character image 702. That is, it is also determined that any other image is not touching.

The repetitive function 198 sequentially repeats the processing of the first memory function 188, the processing of the second memory function 190, the processing of the difference calculating function 192, the processing of the image specifying function 194, and the processing of the contact determining function 196.

While the repetitive function 198 repeats the processing of the above described various functions, if it the counts of determination by the contact determining function 196 becomes a predetermined number of times or more, that the character image 705 is touched by an image having moved (for example, any arbitrary integer that is 5 or more can be selected) the parameter changing function 198 increases parameters such as experiential data, physical energy, offensive power, which are registered in the record associated with the identification number of the card 542 in the object information table 118.

In the processing above, the image 208c determined by the contact determining function 196 as touching the character image 702, out of the images 208a to 208c specified by the image specifying function 194, is assumed as a pseudo image of user's hand 210, and it is also assumed that the user is patting and fondling the character.

Therefore, in addition to a versus-fighting game and the like, it is preferably applied to a breeding game, in which a user breeds a specific character, so as to enhance offensive power, defensive power, and the like.

It is to be noted here that when the user is patting and fondling the character by hand, there may be a case where the image of the user's hand 210 covers the character image 702, and the character image 702 is hardly seen even if an action that the character is delighted is drawn in the image memory 20.

Considering such a situation above, when the pickup image is drawn in the image memory 20, Z value of the Z buffering may be set, for example, to the highest value (a value indicating that it is positioned at the furthermost from a camera viewpoint being an origin in the camera coordinate system). Accordingly, even when an image that the user is patting the character by hand is displayed, the character image 702 is not covered by the image of user's hand 210. Therefore, the user is allowed to fondle the character while seeing the character is delighted, thereby giving an amusement to the breeding game, and the like.

In the meantime, according to a progress of the video game, the card put on the desk, table, or the like 52 may be moved by a hand of user. For example, this happens when at least one of the cards are displaced, the cards are switched in position, replaced by a new card, or the like. If there is a motion in a card as thus described, it is necessary to recognize again the card thus moved.

In order to solve the problem above, the card recognition program 82, the first card position forecasting program 88, and the second card position forecasting program 90 may be started every unit of some frames, or dozens of frames. It is a matter of course that when a new card (for example, card 541) is recognized, the character appearance display program 84 is started and a character image 701 associated with the identification number and the like of the new card 541 may appear on the identification image 561 of the new card 541. Furthermore, in just a simple case such that a card is displaced from the position or the card positions are switched, the character action display program 86 is started, and an action of "waiting" is displayed, for example.

In the re-recognition of the card, as described above, the card recognition program 82, the first card position forecasting program 88, and the second card position forecasting program 90 may be started every unit of some frames, or dozens of frames. Alternatively, the re-recognition of the card is performed only when a card is moved.

Hereinafter, the method for the above processing, that is, a processing of the card motion detecting program 94 and card re-recognition program 96 will be explained.

Firstly, the card motion detecting program 94 obtains a difference between the image data picked up at a predetermined timing, and image data picked up at a timing different from the predetermined timing, and a card having moved is specified based on the data obtained as a difference.

Figure 22A:
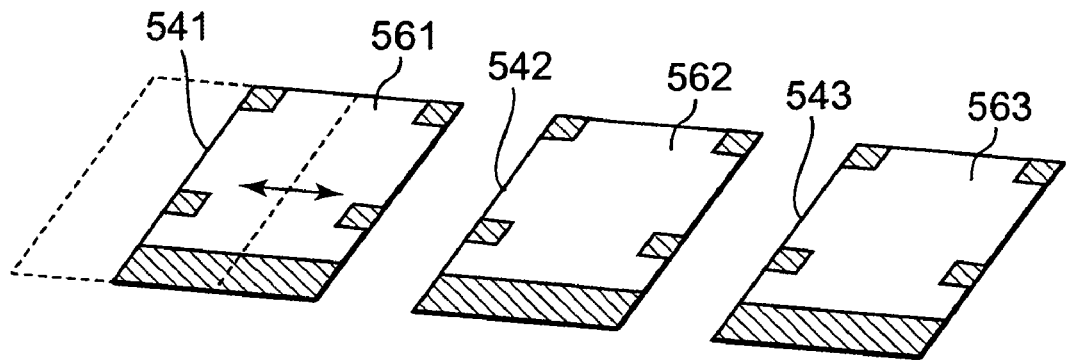
FIG. 22A is an illustration showing a status moving one card sideways.
Figure 22B:
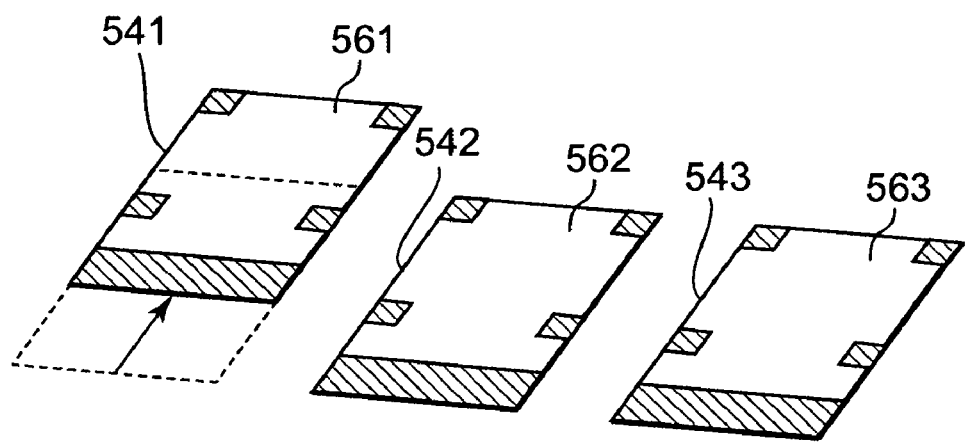
FIG. 22B is an illustration showing a status displacing one card.
Figure 22C:
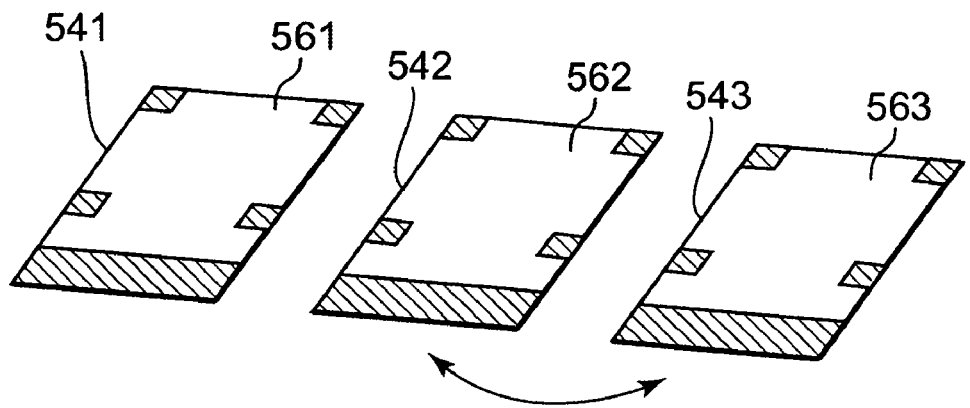
FIG. 22C is an illustration showing a status that positions of two cards are switched.
Figure 23A:
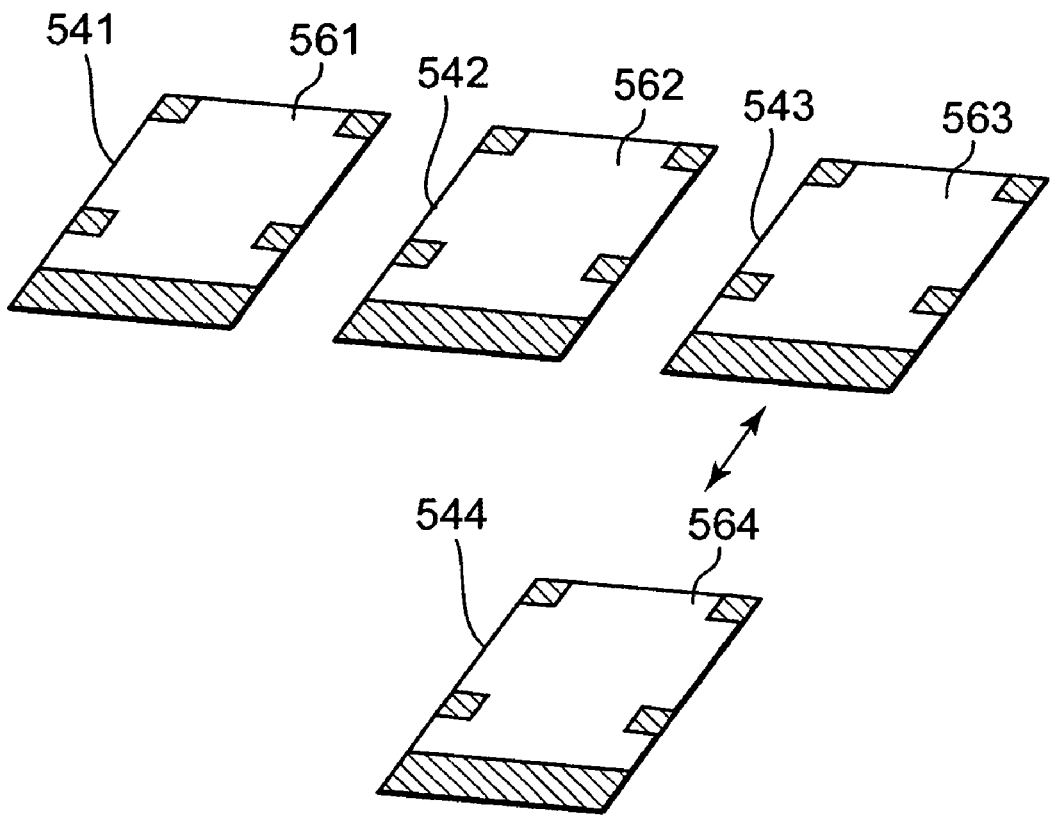
FIG. 23A is an illustration to show a status that one card is replaced with a new card.
Figure 23B:
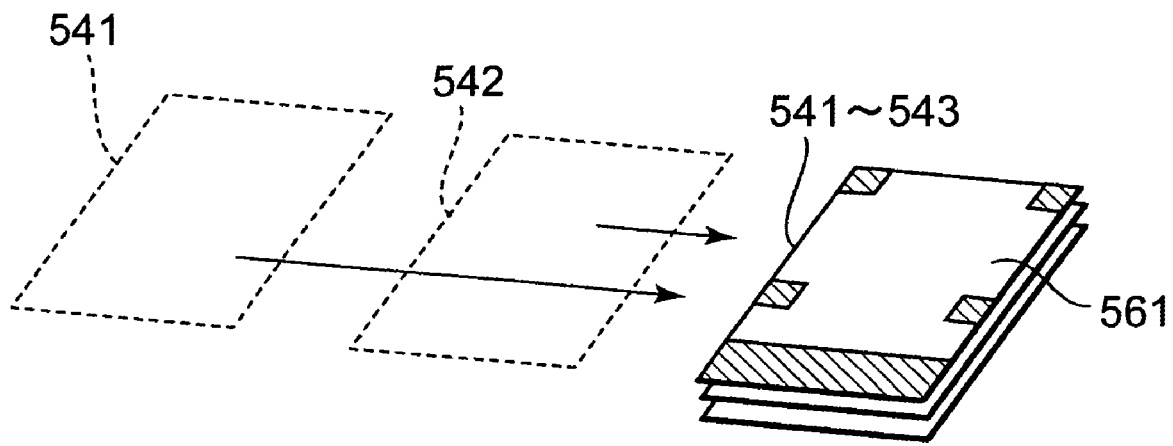
FIG. 23B is an illustration showing a status that three cards are superimposed on another.

In other words, the three cards 541 to 543 for example, placed on the desk, table, or the like 52, are subsequently subjected to the following: as shown in FIG. 22A, one card 541, for instance, is moved sideways by the user's hand; as shown in FIG. 22B, one card 541 is displaced to one direction; as shown in FIG. 22C, the positions of the multiple cards 542 and 543 placed together are switched (relocation); as shown in FIG. 23A, for example, one card 541 is replaced with a new card 544; and as shown in FIG. 23B, three cards 541 to 543 placed together are superimposed on another. This program 94 detects such motions as described above and specifies a card having moved.

Figure 24:
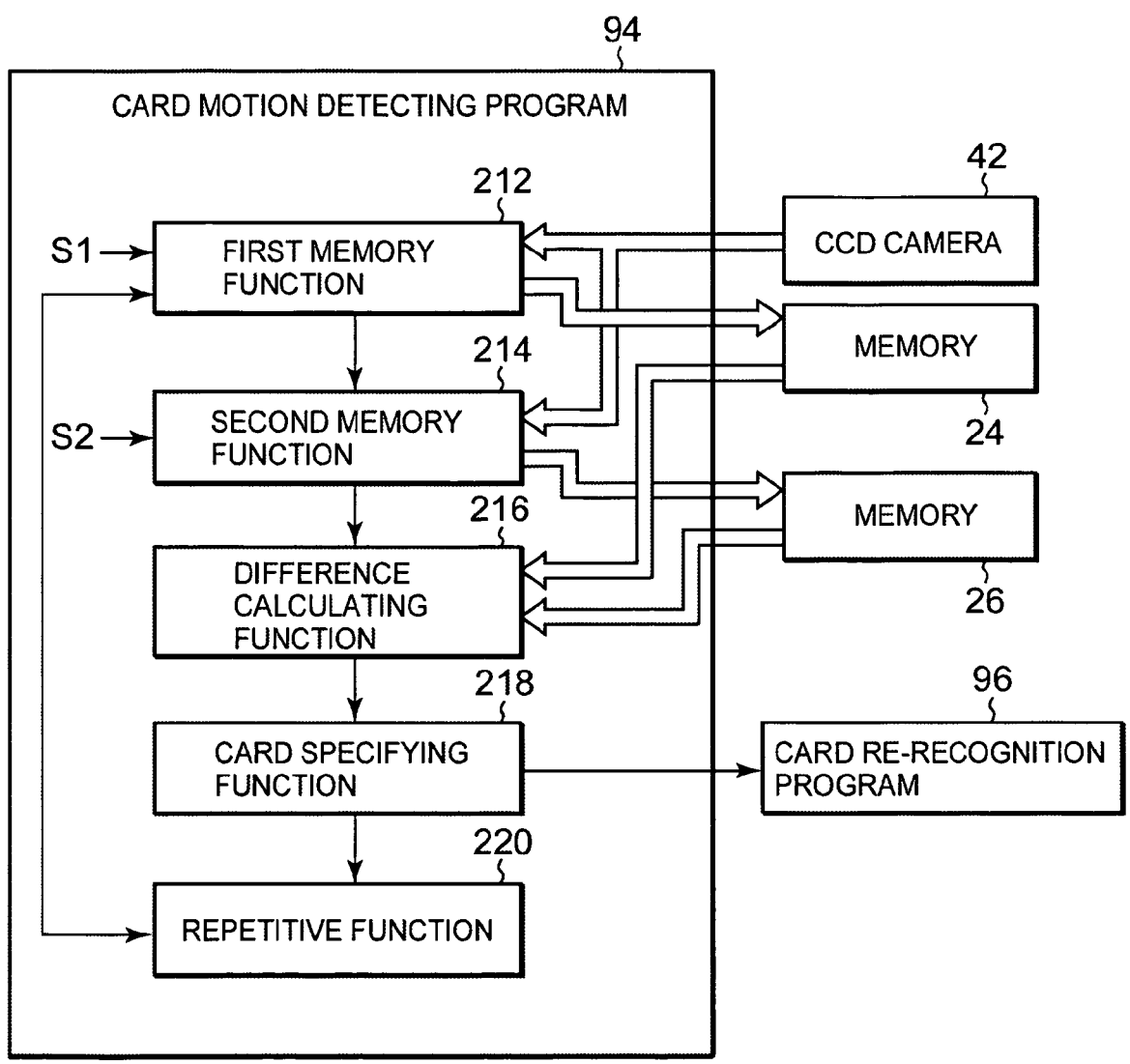
FIG. 24 is a block diagram showing functions of card motion detecting program.

As shown in FIG. 24, the program 94 includes, similar to the image motion detecting program 92 as described above, the first memory function 212, the second memory function 214, and the difference calculating function 216. In addition, the program 94 further includes the card specifying function 218 and the repetitive function 220.

The first and the second memory functions 212 and 214, and the difference calculating function 216 perform the same processing as those of the first and the second memory functions 188 and 190 and the difference calculating function 192 of the image motion detecting program 92 as described above. Therefore, tedious explanation will not be made. The repetitive function 220 sequentially repeats the processing of the first memory function 212, the processing of the second memory function 214, the processing of the difference calculating function 216, and the card specifying function 218.

The card specifying function 128 performs detection as to a range where a card (for example, card 541) is placed, out of the data obtained as difference, and finds out whether or not the identification image 561 of the card 541 exists. The identification image 561 of the card 541 in this situation includes an identification image (positive image) of the new card 541 that has appeared by moving, and an identification image (negative image) of the card 541 that has disappeared by moving. If the identification image 561 of the card 541 exists, it is determined there has been a motion as for the card 541, and a recording range of the image 561 of the card 541 is detected as a screen coordinate.

Specifically, when there is an action that one card 541 is displaced or moved sideways, the screen coordinate of the image 561 of one card 541 is detected. When there is an action that two or more cards (for example cards 541 to 543) are displaced or moved sideways, screen coordinates of respective identification images 561 to 563 of at least two cards 541 to 543, which have been displaced or moved sideways, are detected.

As shown in 22C, for example, when the card 542 and the card 543 are switched, screen coordinates of the respective identification images 562 and 563 of the cards 542 and 543 thus switched are detected. As shown in FIG. 23A, for example, when the card 543 is replaced with another card 544, screen coordinates of the respective identification images 563 and 564 of the cards 543 and 544 thus replaced are detected. As shown in FIG. 23B, for example, when three card 541 to 543 are superimposed on another, screen coordinate of the identification image 561 of the uppermost card (for example card 541) is detected, out of the three cards 541 to 543 thus superimposed.

As thus described, at the stage where a screen coordinate of identification image of a card is detected, the card having moved is specified. The screen coordinate thus detected is supplied to the card re-recognition program 96 that will be started subsequently.

Next, the card re-recognition program 96 will be explained. This program 96 is started when the card specifying function 218 of the card motion detecting program 94 specifies a card having moved, and the identification information is recognized again as to the card having moved.

Figure 25:
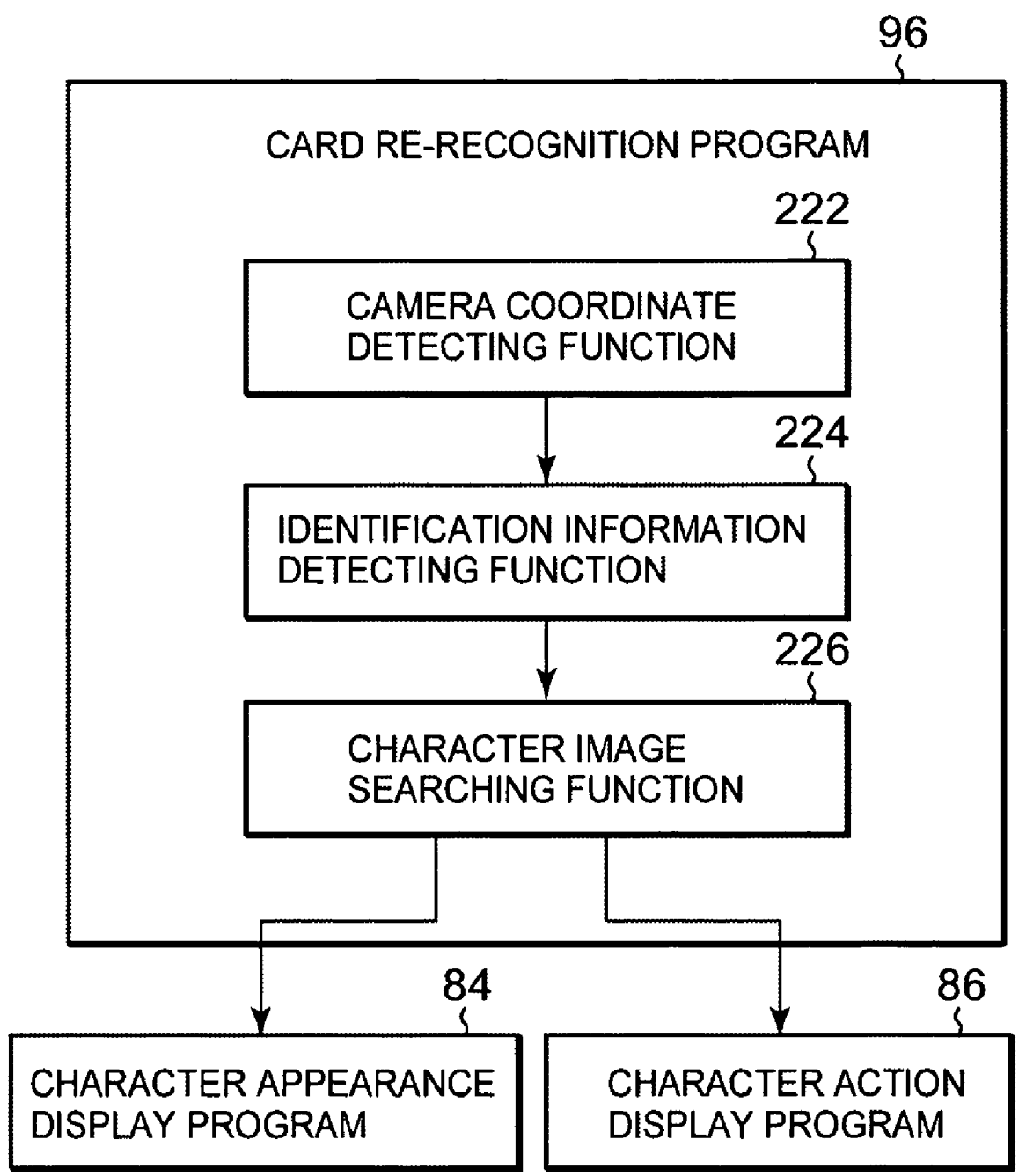
FIG. 25 is a block diagram showing functions of card re-recognition program.

As shown in FIG. 25, the card re-recognition program 96 includes, similar to the card recognition program 82 as described above, camera coordinate detecting function 222, identification information detecting function 224, and character image searching function 226. Since the processing in the card re-recognition program 96 is almost the same as that of the aforementioned card recognition program 82, tedious explanation will not be made here.

According to the processing of the card re-recognition program 96, a character image associated with the identification number and the like of the card having moved is specified. Therefore, when a new card is recognized, the character appearance display program 84 is started, and a character image associated with the identification number and the like of the new card appears on the image of the new card.

In just a simple case such that a card is displaced from the position or the card positions are switched, the character action display program 86 is started, and the character image associated with the identification number and the like of the card is displayed, and simultaneously an action is performed, such as "to attack", "to enchant", "to be defensive", or "to protect" according to how the card is moved.

When multiple cards are superimposed on another, the character image associated with the identification number and the like of the card placed on the top may appear. Alternatively, by storing the identification numbers of at least two cards thus superimposed, a new character associated with a combination of at least two identification numbers may appear. For example, at least two characters associated with the cards thus superimposed may merge into a new character, such as an enormous character. This will be achieved by performing a process such that a record associated with the combination of at least two identification information items is retrieved from a merging information table, not illustrated, and a character image is read out, being associated with the merged item from the head address of the image data registered in the record thus retrieved.

Figure 26:
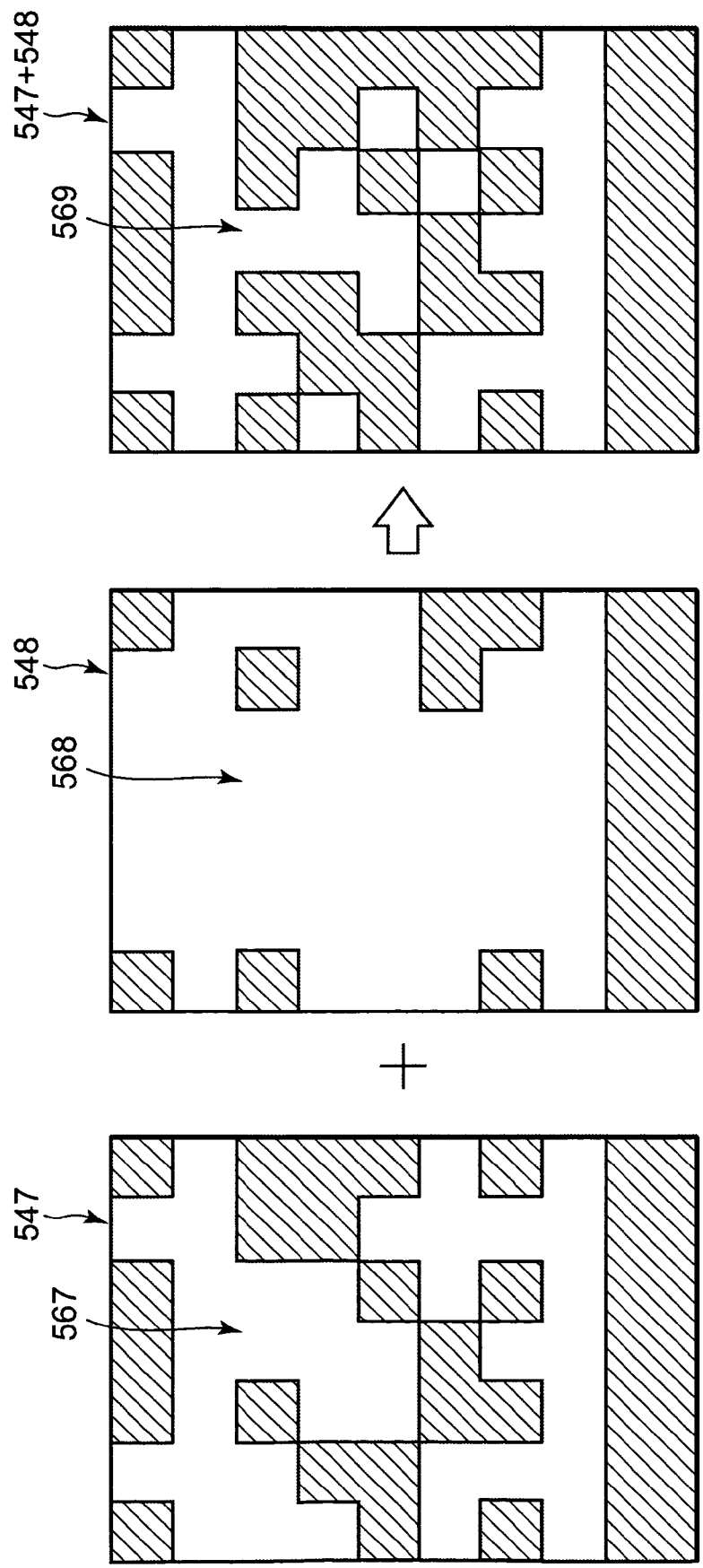
FIG. 26 is an illustration showing an example to superimpose transparent cards on another to combine two 2D codes.

As shown in FIG. 26, when two transparent cards 547 and 548 are superimposed on another, a new identification image 569 is formed, which is a composite image of the identification image 567 of the transparent card 547 and the identification image 568 of the transparent card 548. Therefore, the new identification image 569 is recognized by the card recognition program 82, and subsequently, the character appearance display program 84 is started, for example. Then, on the screen of the monitor 30, it is displayed a new character image being associated with the identification number and the like specified by the identification image 569 appears on this new identification image 569.

Figure 27:
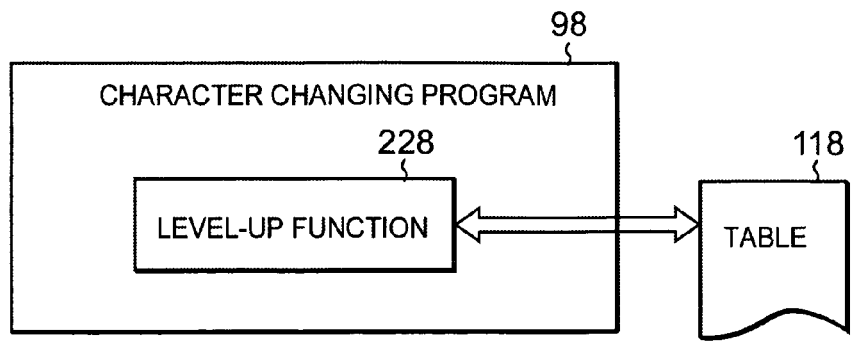
FIG. 27 is a block diagram showing functions of character changing program.

Next, the character changing program 98 will be described. This program 98 is configured such that at the time of level-up, a character image is changed into an image in accordance with the level. As shown in FIG. 27, it includes a level-up function 228.

This program 98 is started every time when writing into the object information table 118, in particular, writing into the experiential data is performed by the various application programs 80 as described above. The level-up function 228 determines as to the record in which the experiential data is written, whether or not the experiential data stored in the record is beyond a certain value. If it is beyond the value, the level stored in the record is updated to be incremented by one.

As described above, the card recognition program 82 and the card re-recognition program 96 retrieve image data associated with the identification number and the level of the card, and the character appearance display program 84 and the character action display program 86 retrieve an action data string associated with the identification number and the level of the card. Accordingly, on the identification image on the card, a character image associated with the identification number and the level of the card is displayed in such a manner as being superimposed thereon.

Figure 28:
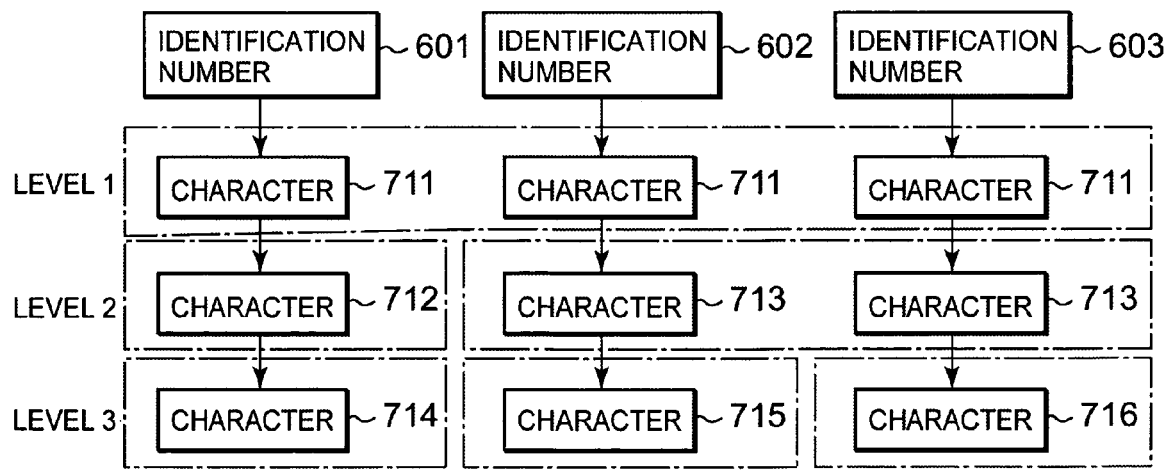
FIG. 28 is an illustration to show an example where an image of the character is changed according to the identification number and the level.

Therefore, as shown in FIG. 28 for example, when there are three identification numbers (the first to the third identification numbers 601 to 603), at level 1, the same character (the first character) image 711 is associated with each of the three identification numbers. However, it is possible that at level 2, the first identification number 601 is associated with the second character image 712, and the second and the third identification numbers 602 and 603 are each associated with the third character image 713. It is further possible that at level 3, the identification numbers are respectively associated with the images 714 to 716 of different characters (the fourth to the sixth characters).

It is possible of course the same character image is associated therewith, from level 1 to level 2 as to one identification number for example. It is possible alternatively that at the stage where the level 1 becomes level 2, the image may be changed to another character image, but being the same character image from level 2 to level 3. In addition, the character image may be the same from level 1 to level 3 as to one identification number.

Accordingly, even if the card is of the same kind from which the same character appears, it is possible to provide a user with imagery that the character is experiencing various evolutions according to the level, thereby enhancing the interest of the card game.

Figure 29:
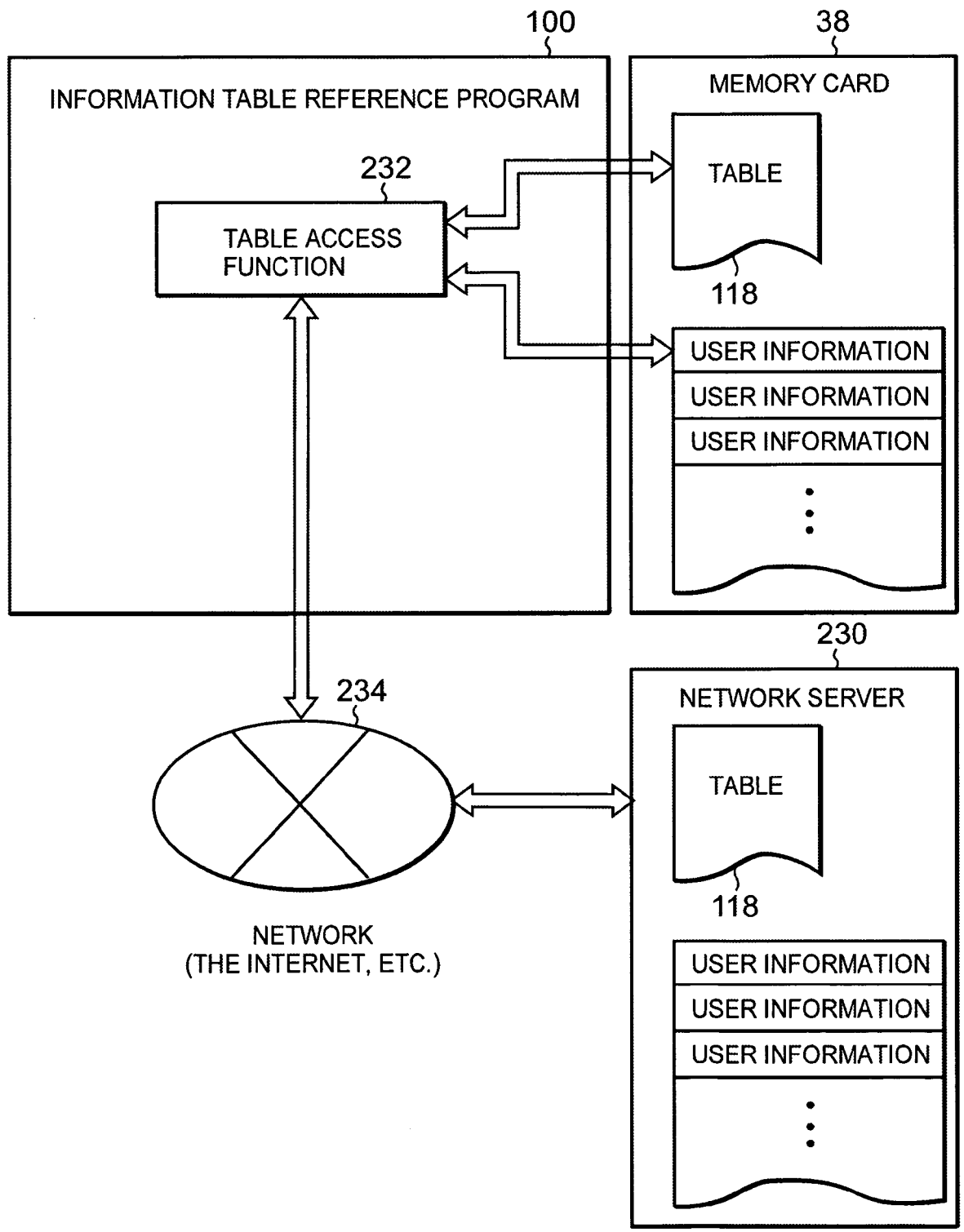
FIG. 29 is a block diagram showing functions of information table reference program.

Next, the information table reference program 100 will be explained. As shown in FIG. 29, this program 100 is to access memory card 38, or network server 230, when the memory card 38 or the network server 230 manages the object information table 118 and the like, and it includes table access function 232. The network server 230 is connected to the video game system 10 relating to the embodiment of the present invention via the network 234.

For example, when the object information table 118 is stored in the hard disk 44, a character, a parameter, and the like, being associated with a card, are different by user. Therefore, transfer of the card may be almost meaningless if the contents of the object information table 118 are different.

Considering the situation above, the information table reference program 100 enables a transfer of the card. If an accessing destination is the memory card 38, the table access function 232 registers user information for fighting. Then, the use of the object information table 118 registered in the memory card 38 is limited only to the user registered in the memory card 38. Accordingly, transferring the card is available among the users registered in the memory card 38.

If the accessing destination is the network server 230, the table access function 232 registers in the network server 230, via a browser, the user information for fighting. Then, using the object information table 118 managed by the network server 230 is permitted to the users.

In such a case as described above, the object information table 118 managed by the network server 230 becomes information unique to the users registered in the network server 230, and this information may be common in all the registered users. Therefore, card transferring among the users registered in the network server 230 is available.

If the network server 230 manages the object information table 118, it is possible to perform a processing that, as to a record having been set as "invalid", a character image is newly registered or a parameter is setup, after a lapse of predetermined period of time, by version upgrade of the video game, or the like, so that the record is reconfigured to "valid".

In such a case as described above, addition of a new character in accordance with a production of a new card, revival of deceased character, and the like are carried out smoothly with an advertisement on a home page, achieving an effective use of the card and the like.

Furthermore, as shown in FIG. 2B, 2D patterns in the cord part 60 in the identification image 56 of the card is configured such that multiple identification cells 66 are arranged. Therefore, the 2D pattern of the card part 60 may be changed freely, by adding a coated part on the identification cell 66 with black oil-based pen or water-based pen, or by erasing the identification cell 60 with a white oil-based pen or water-based pen. This provides an enjoyment such as expecting what type of object image will appear, and what kind of form the image will change into by the level-up, thereby giving a further amusement to the video game into which the card game is merged.

It should be understood that the image display system, the image processing system, and the video game system relating to the present invention are not limited to the disclosed embodiments, but are susceptible of changes and modifications without departing from the scope of the invention.

What is claimed is:

1. An image display system comprising,
a computer,
an image pickup means which is connected to said computer and picks up an actual image of a card to which an identification image is attached, and
a display device which is connected to said computer, wherein,
said system further comprising,
a pickup image display means which outputs to said display device, image data of a pickup image including said identification image of said card, from said image pickup means, and allows said display device to display said pickup image,
a finding means which finds image data of said identification image attached to said card, out of said image data of said pickup image,
an identification information detecting means which detects identification information of said card from said image data of said identification image which is found out by said finding means,
an object display control means which controls so that a virtual object image associated with said identification information of said card is displayed on said identification image of said card displayed on said display device, in such a manner as being superimposed on said identification image, a difference calculating means which obtains a difference user image by determines calculating differences between first user image data picked up at a predetermined timing and different second user image data picked up at a timing different from said predetermined timing, a contact determining means which determines whether or not said difference user image comes into contact with said virtual object image, based on a screen coordinate of said difference user image and a screen coordinate of said object image displayed on said display device, in such a manner as being superimposed on said identification image of said card, and a parameter changing means which changes a parameter associated with said identification information, when it is determined that said difference user image comes into contact with said virtual object image.

2. The image display system according to claim 1, wherein, said, contact determining means determines that, when a screen coordinate of said difference user image and a screen coordinate of said object image displayed on said display device, in such a manner as being superimposed on said identification image of said card are identical, said difference user image comes into contact with said object image.

3. The image display system according to claim 1 or 2, wherein, while said system repeatedly conducts a series of procedures consisting of said difference calculating means and said contact determining means to be conducted in order, said parameter changing means changes a parameter associated with said identification information, when a number of times that said difference image comes into contact with said object image is determined to exceed over predetermined number.

4. The image display system according to claim 1, wherein, an image specifying means includes the image data of said actual image having moved as image data of a user's hand image.

5. The image display system according to claim 1, wherein, multiple identification information items are allocated to an identical virtual object, and parameters regarding said identical virtual object are different in each of said multiple identification information items.

6. The image display system according to claim 1, wherein, a storage medium connected to said computer and freely removable is provided, and data associated with said identification information is managed by said storage medium.

7. The image display system according to claim 1, wherein, said computer is connected to a network server via a network, and data associated with said identification information is managed by said network server.

8. The image display system according to claim 1, further comprising, wherein a Z value of a Z buffering is set to a maximum value indicating a value furthermost from said image pickup means in an image pickup means coordinate system.

* * * * *

UNITED STATES PATENT AND TRADEMARK OFFICE
CERTIFICATE OF CORRECTION

PATENT NO. : 7,690,975 B2  Page 1 of 1
APPLICATION NO. : 11/243481
DATED : April 6, 2010
INVENTOR(S) : Yusuke Watanabe It is certified that error appears in the above-identified patent and that said Letters Patent is hereby corrected as shown below:

Title Page Item (73) on the front page of the patent in the left column is deleted and the following is substituted:
Item (73)   Assignee:   Sony Computer Entertainment Inc. Tokyo (JP)
Sony Corporation Tokyo (JP)

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,690,975 B2  Page 1 of 1
APPLICATION NO. : 11/243481
DATED : April 6, 2010
INVENTOR(S) : Yusuke Watanabe It is certified that error appears in the above-identified patent and that said Letters Patent is hereby corrected as shown below:

Title page should read:

Item (73)   Assignee:   Sony Computer Entertainment Inc. Tokyo (JP)
                        Sony Corporation Tokyo (JP)

Signed and Sealed this

Nineteenth Day of October, 2010

David J. Kappos
*Director of the United States Patent and Trademark Office*